United States Patent
Zhu et al.

(10) Patent No.: US 11,259,149 B2
(45) Date of Patent: Feb. 22, 2022

(54) MULTICAST METHOD AND APPARATUS

(71) Applicant: HUAWEI TECHNOLOGIES CO., LTD., Guangdong (CN)

(72) Inventors: Hualin Zhu, Shanghai (CN); Huan Li, Shanghai (CN); Weisheng Jin, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 7 days.

(21) Appl. No.: 16/787,707

(22) Filed: Feb. 11, 2020

(65) Prior Publication Data

US 2020/0178042 A1 Jun. 4, 2020

Related U.S. Application Data

(63) Continuation of application No. PCT/CN2018/100111, filed on Aug. 10, 2018.

(30) Foreign Application Priority Data

Aug. 14, 2017 (CN) .......................... 201710693534.0
Apr. 2, 2018 (CN) .......................... 201810283926.4

(51) Int. Cl.
*H04W 4/06* (2009.01)
*H04W 76/10* (2018.01)
*H04L 12/18* (2006.01)

(52) U.S. Cl.
CPC ............. *H04W 4/06* (2013.01); *H04W 76/10* (2018.02); *H04L 12/189* (2013.01)

(58) Field of Classification Search
CPC ...... H04W 68/005; H04W 76/10; H04W 4/06
See application file for complete search history.

(56) References Cited

U.S. PATENT DOCUMENTS

| | | | |
|---|---|---|---|
| 8,774,180 | B2 | 7/2014 | Lo et al. |
| 2004/0264463 | A1 | 12/2004 | Fukushima et al. |
| 2008/0151911 | A1 | 6/2008 | Chen |
| 2010/0111084 | A1 | 5/2010 | Yao et al. |

(Continued)

FOREIGN PATENT DOCUMENTS

| | | |
|---|---|---|
| CN | 1852570 A | 10/2006 |
| CN | 101141688 A | 3/2008 |

(Continued)

OTHER PUBLICATIONS

Office Action issued in Chinese Application No. 201810283926.4 dated Jan. 3, 2020, 21 pages (With English Translation).

(Continued)

*Primary Examiner* — Joshua L Schwartz
(74) *Attorney, Agent, or Firm* — Fish & Richardson P.C.

(57) ABSTRACT

Embodiments of this disclosure relate to the communications field, and provide a multicast method and apparatus, to transmit multicast data in a wireless network. An example method includes: receiving, by a multicast function network element, multicast data from a multicast source and that includes a multicast address; obtaining, by the multicast function network element based on a preset correspondence, terminal information or connection information that corresponds to the multicast address; and sending, by the multicast function network element, the multicast data to a terminal.

17 Claims, 12 Drawing Sheets

(56) References Cited

U.S. PATENT DOCUMENTS

2010/0322128 A1* 12/2010 Becker .................. H04W 4/08
370/312
2021/0076164 A1* 3/2021 Navratil ............. H04W 72/005

FOREIGN PATENT DOCUMENTS

| CN | 101197821 A | 6/2008 | | |
|---|---|---|---|---|
| CN | 101296404 A | 10/2008 | | |
| CN | 101409672 A | 4/2009 | | |
| CN | 101547402 A | 9/2009 | | |
| CN | 101568068 A | 10/2009 | | |
| CN | 101702672 A | 5/2010 | | |
| CN | 105897444 A | 8/2016 | | |
| EP | 1686738 A1 | 8/2006 | | |
| WO | 2009106127 A1 | 9/2009 | | |
| WO | WO-2017026760 A1 * | 2/2017 | ............. | H04L 67/10 |

OTHER PUBLICATIONS

PCT International Search Report and Written Opinion in International Application No. PCT/CN2018/100,111, dated Oct. 18, 2018, 15 pages (With English Translation).
Extended European Search Report issued in European Application No. 18846137.0 dated Mar. 26, 2020, 25 pages.
Office Action issued in Chinese Application No. 201810283926.4 dated Nov. 3, 2020, 7 pages.
Huawei, "Transmit different V2X messages in different broadcast areas," 3GPP TSG-RAN3 Meeting #92, R3-161174, Nanjing, China, May 23-27, 2016, 4 pages.
Office Action issued in Chinese Application No. 201810283926.4 dated Mar. 1, 2021, 4 pages.

* cited by examiner

MULTICAST METHOD AND APPARATUS

CROSS-REFERENCE TO RELATED APPLICATIONS

This application is a continuation of International Application No. PCT/CN2018/100111, filed on Aug. 10, 2018, which claims priority to Chinese Patent Application No. 201810283926.4, filed on Apr. 2, 2018 and Chinese Patent Application No. 201710693534.0, filed on Aug. 14, 2017. The disclosure of the aforementioned applications are hereby incorporated by reference in their entireties.

TECHNICAL FIELD

This application relates to the communications field, and in particular, to a multicast method and apparatus.

BACKGROUND

In a fixed backbone network, to save a transmission bandwidth of the backbone network, data is transmitted in the backbone network by using a multicast technology, and is replicated at a location close to each host joining a multicast group, and then data obtained through replication is distributed to the host.

With rapid development of intelligent terminals and mobile applications, a requirement for user equipment (UE) to access a data network (DN) via a wireless network is increasingly high. A common user plane architecture of the wireless network is shown in FIG. 1. In the architecture, the UE transmits data with the data network by using an access device and a user plane gateway, and a destination device of a data packet is determined based on the internet protocol (IP) in the data transmission process. However, because the user plane gateway determines the destination UE of the data packet based on the IP, a multicast data packet is discarded by the user plane gateway, causing unavailability of transmission of multicast data in the wireless network.

SUMMARY

Embodiments of this disclosure provide a multicast method, a device, and a system, to transmit multicast data in a wireless network.

To achieve the foregoing objectives, the following technical solutions are used in the embodiments of this disclosure.

According to a first aspect, a multicast method is provided, and is applied to a multicast function network element. The method may specifically include: receiving, by the multicast function network element, multicast data from a multicast source and that includes a multicast address; obtaining, by the multicast function network element based on a preset correspondence, terminal information corresponding to the multicast address; and sending, by the multicast function network element, the multicast data to a terminal corresponding to the terminal information.

According to the multicast method provided in this disclosure, when receiving the multicast data, the multicast function network element obtains, based on the preset correspondence, the terminal information corresponding to the multicast address of the multicast data, and can send, based on the terminal information, the multicast data to the terminal corresponding to the terminal information, thereby transmitting the multicast data in a wireless network.

The multicast function network element may be a network element separately deployed in the wireless network, or may be deployed in combination with an existing network element in the wireless network, that is, integrated into an existing network element in the wireless network. For example, the multicast function network element is deployed in combination with a user plane network element. A deployment manner of the multicast function network element is not specifically limited in this disclosure.

With reference to the first aspect, in a possible implementation, before the obtaining, by the multicast function network element based on a preset correspondence, terminal information corresponding to the multicast address, the multicast method provided in this disclosure may further include: receiving, by the multicast function network element, multicast joining information from the terminal, where the multicast joining information includes the multicast address, and the preset correspondence includes a correspondence between the multicast address and the terminal information of the terminal. In this way, the multicast function network element can obtain content in the preset correspondence, and the preset correspondence is used to send the multicast data to the terminal when the multicast data is received.

With reference to the first aspect or the foregoing possible implementation, in a possible implementation, the receiving, by the multicast function network element, multicast joining information from the terminal may be specifically implemented as: receiving, by the multicast function network element from a user plane, the multicast joining information from the terminal, or receiving, by the multicast function network element from a control plane by using a network-side management network element, the multicast joining information from the terminal. In this way, the multicast function network element can receive the multicast joining information in a plurality of scenarios.

The network-side management network element may be a network element between the multicast function network element and the terminal in a wireless network architecture. For example, the network-side management network element may be a session management network element or an access management network element. In network architectures of different standards, the network-side management network element has different names. This is not specifically limited in this disclosure.

It should be noted that, in the wireless network, the receiving, by the multicast function network element, multicast joining information from the terminal may be that the multicast function network element directly receives, from the terminal, the multicast joining information from the terminal; or may be that, owing to a connection relationship in the wireless network architecture, the multicast joining information from the terminal is transmitted to the multicast function network element level by level by using at least one network element between the terminal and the multicast function network element in the wireless network architecture. A transmission path of the multicast joining information is not specifically limited in this disclosure, and may be configured based on an actual scenario and the connection relationship between network elements in the wireless network architecture.

With reference to any one of the first aspect or the possible implementations, in a possible implementation, before the obtaining, by the multicast function network element based on a preset correspondence, terminal information corresponding to the multicast address, the multicast method provided in this disclosure may further include: establishing, by the multicast function network element, a session with the terminal. The multicast function network element can obtain the content in the preset correspondence by obtaining the terminal information of the terminal, and the preset correspondence is used to send the multicast data to the terminal when the multicast data is received.

With reference to any one of the first aspect or the possible implementations, in a possible implementation, before the obtaining, by the multicast function network element based on a preset correspondence, terminal information corresponding to the multicast address, the multicast method provided in this disclosure may further include: receiving, by the multicast function network element, the preset correspondence from a network-side management network element. In this way, the multicast function network element receives the preset correspondence from another network element, and the preset correspondence is used to send the multicast data to the terminal when the multicast data is received.

With reference to any one of the first aspect or the possible implementations, in a possible implementation, the terminal information may include at least one of the following information; address information of the terminal, identifier information of the terminal, and identifier information of the session corresponding to the terminal.

The identifier information of the session corresponding to the terminal may be an identifier (ID) of the session established for the terminal. When a session ID can uniquely correspond to one terminal, the terminal information may be the ID of the session corresponding to the terminal. When a session ID does not uniquely correspond to one terminal, the session ID and an identifier of the terminal, or the session ID and the identifier information of the terminal may be used as the terminal information.

With reference to any one of the first aspect or the possible implementations, in a possible implementation, the sending, by the multicast function network element, the multicast data to a terminal corresponding to the terminal information may be specifically implemented as: sending, by the multicast function network element, the multicast data to the terminal through the session corresponding to the terminal information.

With reference to any one of the first aspect or the possible implementations, in a possible implementation, the sending, by the multicast function network element, the multicast data to a terminal corresponding to the terminal information may be specifically implemented as: modifying, by the multicast function network element, a destination address of the multicast data to an address of the terminal; and sending, by the multicast function network element to the terminal, the multicast data whose destination address has been modified.

According to a second aspect, a multicast method is provided, and is applied to a multicast function network element. The method may specifically include: receiving, by the multicast function network element, multicast data from a multicast source and that includes a multicast address; obtaining, by the multicast function network element based on a preset correspondence, connection information corresponding to the multicast address; and sending, by the multicast function network element, the multicast data to a terminal through a connection corresponding to the connection information.

According to the multicast method provided in this disclosure, when receiving the multicast data, the multicast function network element obtains, based on the preset correspondence, the connection information corresponding to the multicast address of the multicast data, and can send, based on the connection information, the multicast data to the terminal accessing the connection corresponding to the connection information, thereby transmitting the multicast data in a wireless network.

The multicast function network element may be a network element separately deployed in the wireless network, or may be deployed in combination with an existing network element in the wireless network, that is, integrated into an existing network element in the wireless network. For example, the multicast function network element is deployed in combination with a user plane network element. A deployment manner of the multicast function network element is not specifically limited in this disclosure.

The connection is a link for data transmission between the terminal and a DN, and the connection information is information used to indicate the link. Specific content of the connection information may be defined based on an actual requirement. This is not specifically limited in this disclosure. A connection device is deployed on the connection between the multicast function network element and the terminal, and the multicast function network element sends the multicast data to the terminal on the connection by using the connection device.

For example, the connection information may be CN tunnel information. For example, the connection device may be a tunnel endpoint device, for example, a next generation radio access network (NG-RAN) device, a user plane function (UPF) network element, a 4th generation mobile communications technology (4G) access network (E-UTRAN) device, or a non-3rd generation partnership project (3GPP) radio access network gateway (an untrusted non-3GPP access network gateway such as a non-3GPP interworking function (N3IWF), a trusted non-3GPP access network device, an access gateway function (AGF) in a wired access network, or a broadband network gateway (BNG)). This is not specifically limited in this disclosure.

With reference to the second aspect, in a possible implementation, before the obtaining, by the multicast function network element based on a preset correspondence, connection information corresponding to the multicast address, the multicast method provided in this disclosure may further include: receiving, by the multicast function network element, multicast joining information from the terminal, where the multicast joining information includes the multicast address, and the preset correspondence includes a correspondence between the multicast address and the connection information of the connection accessed by the terminal. In this way, the multicast function network element can obtain content in the preset correspondence, and the preset correspondence is used to send the multicast data to the terminal when the multicast data is received.

With reference to the second aspect or the foregoing possible implementation, in a possible implementation, the receiving, by the multicast function network element, multicast joining information from the terminal may be specifically implemented as: receiving, by the multicast function network element from a user plane, the multicast joining information from the terminal; or receiving, by the multicast function network element from a control plane by using a network-side management network element, the multicast joining information from the terminal. In this way, the multicast function network element can receive the multicast joining information in a plurality of scenarios.

With reference to any one of the second aspect or the possible implementations, in a possible implementation, before the obtaining, by the multicast function network element based on a preset correspondence, connection information corresponding to the multicast address, the multicast method provided in this disclosure may further include: establishing, by the multicast function network element, a session with the terminal. The multicast function network element can obtain the content in the preset correspondence by obtaining the connection information of the connection accessed by the terminal, and the preset correspondence is used to send the multicast data to the terminal when the multicast data is received.

With reference to any one of the second aspect or the possible implementations, in a possible implementation, before the obtaining, by the multicast function network element based on a preset correspondence, connection information corresponding to the multicast address, the multicast method provided in this disclosure may further include: receiving, by the multicast function network element, the preset correspondence from a network-side management network element. In this way, the multicast function network element receives the preset correspondence from another network element, and the preset correspondence is used to send the multicast data to the terminal when the multicast data is received.

With reference to any one of the second aspect or the possible implementations, in a possible implementation, the connection information may include at least one of the following information; address information of a connection device on the connection corresponding to the connection information, identifier information of the connection device, and identifier information of the connection.

The connection information is used to uniquely indicate a connection. The address information of the connection device on the connection corresponding to the connection information is an address attribute of the connection device; and may be physical address information of the connection device, or may be a virtual address or the like of the connection device. This is not specifically limited in this disclosure. The identifier information of the connection device is used to uniquely identify the connection device, and may be an ID or the like of the connection device. This is not specifically limited in this disclosure. The identifier information of the connection is used to uniquely identify the connection, and may be a tunnel endpoint identifier (TEID) or the like. This is not specifically limited in this disclosure.

With reference to any one of the second aspect or the possible implementations, in a possible implementation, the sending, by the multicast function network element, the multicast data to a terminal through a connection corresponding to the connection information may be specifically implemented as: sending, by the multicast function network element, the multicast data to the terminal by using the connection device on the connection corresponding to the connection information.

With reference to any one of the second aspect or the possible implementations, in a possible implementation, the sending, by the multicast function network element, the multicast data to a terminal through a connection corresponding to the connection information may be specifically implemented as: modifying, by the multicast function network element, a destination address of the multicast data to an address of the terminal; and sending, by the multicast function network element to the terminal by using the connection device on the connection corresponding to the connection information, the multicast data whose destination address has been modified.

According to a third aspect, another multicast method is provided, and is applied to a terminal. The method may include: sending, by the terminal, multicast indication information to an access management network element, where the multicast indication is used to establish a session used for a multicast service; and receiving, by the terminal, multicast data from a multicast function network element through the session used for the multicast service.

According to the multicast method provided in this disclosure, the terminal sends the multicast indication used to establish the session used for the multicast service, so that a network side establishes, for the terminal, the session used for the multicast service, and the multicast function network element can send the multicast data to the terminal through the session that is established for the terminal and that is used for the multicast service, thereby transmitting the multicast data in a wireless network.

With reference to the third aspect, in a possible implementation, the multicast indication information may include a data network name or a multicast indication. On this basis, before the receiving, by the terminal, multicast data from a multicast function network element through the session used for the multicast service, the multicast method provided in this disclosure may further include: sending, by the terminal, multicast joining information to the multicast function network element, where the multicast joining information includes a multicast address, and the multicast data includes the multicast address.

With reference to the third aspect or the foregoing possible implementation, in a possible implementation, the sending, by the terminal, multicast indication information to an access management network element may be specifically implemented as: sending, by the terminal, multicast joining information to the access management network element, where the multicast indication information is the multicast joining information.

With reference to any one of the third aspect or the possible implementations, in a possible implementation, the sending, by the terminal, multicast indication information to an access management network element may be specifically implemented as: sending, by the terminal, a session establishment request to the access management network element, where the session establishment request includes the multicast indication information; or sending, by the terminal, a registration request to the access management network element, where the registration request includes the multicast indication information.

With reference to any one of the third aspect or the possible implementations, in a possible implementation, a destination address of the multicast data that is received by the terminal from the multicast function network element is an address of the terminal.

According to a fourth aspect, still another multicast method is provided, and is applied to an access management network element. The method may specifically include: receiving, by the access management network element, multicast indication information from a terminal; and selecting, by the access management network element based on the multicast indication information, a session management network element supporting a multicast service.

According to the multicast method provided in this disclosure, the access management network element receives the multicast indication information from the terminal, and selects the session management network element supporting the multicast service, to establish, for the terminal, a session used for the multicast service. In this way, multicast data can be sent to the terminal through the session that is established for the terminal and that is used for the multicast service, thereby transmitting the multicast data in a wireless network.

In networks of different standards, the access management network element and the session management network element each have different names. This is not specifically limited in this disclosure. Any network element used for access management in the wireless network may be referred to as the access management network element described in this disclosure, and any network element used for session management in the wireless network may be referred to as the session management network element described in this disclosure.

With reference to the fourth aspect, in a possible implementation, after the selecting, by the access management network element based on the multicast indication information, a session management network element supporting a multicast service, the multicast method provided in this disclosure may further include: establishing, by the access management network element for the terminal with the selected session management network element supporting the multicast service, a session used for the multicast service.

With reference to the fourth aspect or the foregoing possible implementation, in a possible implementation, the multicast indication information may include a data network name or a multicast indication.

With reference to any one of the fourth aspect or the possible implementations, in a possible implementation, the receiving, by the access management network element, multicast indication information from a terminal may be specifically implemented as: receiving, by the access management network element, multicast joining information from the terminal. In this implementation, the multicast indication information is the multicast joining information.

With reference to any one of the fourth aspect or the possible implementations, in a possible implementation, the multicast joining information includes a multicast address; and after the receiving, by the access management network element, multicast joining information from the terminal, the multicast method provided in this disclosure may further include: associating, by the access management network element, terminal information of the terminal with the multicast address into a preset correspondence, and sending, by the access management network element, the preset correspondence to a multicast function network element. In this way, the multicast function network element transmits the multicast data based on the preset correspondence from the access management network element to the multicast function network element.

With reference to any one of the fourth aspect or the possible implementations, in a possible implementation, the multicast joining information includes a multicast address; and after the receiving, by the access management network element, multicast joining information from the terminal, the multicast method provided in this disclosure may further include: associating, by the access management network element, connection information of the terminal with the multicast address into a preset correspondence; and sending, by the access management network element, the preset correspondence to a multicast function network element. In this way, the multicast function network element transmits the multicast data based on the preset correspondence from the access management network element to the multicast function network element.

It should be noted that in this disclosure, the connection information of the terminal is used to indicate a connection between the terminal and the multicast function network element.

For a process in which the multicast function network element transmits the multicast data based on the preset correspondence, refer to the specific implementation of the multicast method provided in the first aspect. Details are not described herein again.

Specifically, based on a connection relationship between network elements in a wireless network architecture, the sending, by the access management network element, the preset correspondence to a multicast function network element may be specifically implemented as: sending, by the access management network element, the preset correspondence to the multicast function network element by using the session management network element.

With reference to any one of the fourth aspect or the possible implementations, in a possible implementation, after the receiving, by the access management network element, multicast joining information from the terminal, the multicast method provided in this disclosure may further include: sending, by the access management network element, the multicast joining information to the session management network element. The access management network element sends the multicast joining information to the session management network element, so that the session management network element sends the multicast joining information to a user plane network element, and the user plane network element sends the multicast joining information to the multicast function network element. In this way, the terminal sends the multicast joining information to the multicast function network element, and the multicast function network element receives the multicast joining information from the terminal.

If the multicast function network element is deployed inside the user plane network element in a centralized manner, that the user plane network element sends the multicast joining information to the multicast function network element is specifically implemented as: After a functional unit that is in the user plane network element and that interacts with the session management network element receives the multicast joining information, the functional unit sends the multicast joining information to the multicast function network element deployed in the user plane network element. If the multicast function network element is separately deployed in the wireless network and is connected to the user plane network element, that the user plane network element sends the multicast joining information to the multicast function network element is specifically implemented as: After a functional unit that is in the user plane network element and that interacts with the session management network element receives the multicast joining information, the functional unit sends the multicast joining information to the multicast function network element connected to the user plane network element.

With reference to any one of the fourth aspect or the possible implementations, in a possible implementation, the terminal information of the terminal includes at least one of the following information; an address of the terminal, an identifier of the terminal, and an identifier of the session used by the terminal for multicast. Identifier information of the session corresponding to the terminal may be an ID of the session established for the terminal. When a session ID can uniquely correspond to one terminal, the terminal information may be the ID of the session corresponding to the terminal. When a session ID does not uniquely correspond to one terminal, the session ID and the identifier of the terminal, or the session ID and identifier information of the terminal may be used as the terminal information.

With reference to any one of the fourth aspect or the possible implementations, in a possible implementation, the connection information includes at least one of the following information; address information of a connection device on a connection corresponding to the connection information, identifier information of the connection device, and identifier information of the connection.

With reference to any one of the fourth aspect or the possible implementations, in a possible implementation, the receiving, by the access management network element, multicast indication information from a terminal may be specifically implemented as: receiving, by the access management network element, a session establishment request from the terminal, where the session establishment request includes the multicast indication information; or receiving, by the access management network element, a registration request from the terminal, where the registration request includes the multicast indication information.

According to a fifth aspect, still another multicast method is provided, and is applied to a session management network element in a wireless network. The method may specifically include: receiving, by the session management network element, multicast indication information from a terminal or an access management network element; and selecting, by the session management network element based on the multicast indication information, a user plane network element supporting a multicast service.

According to the multicast method provided in this disclosure, the session management network element receives the multicast indication information from the terminal or the access management network element, and selects the user plane network element supporting the multicast service, to establish, for the terminal, a session used for the multicast service. In this way, multicast data can be sent to the terminal through the session that is established for the terminal and that is used for the multicast service, thereby transmitting the multicast data in the wireless network.

Based on a network element connection in a wireless network architecture, the receiving, by the session management network element, multicast indication information from a terminal may be specifically implemented as: receiving, by the session management network element, the multicast indication information from the terminal by using the access management network element.

With reference to the fifth aspect, in a possible implementation, after the selecting, by the session management network element based on the multicast indication information, a user plane network element supporting a multicast service, the multicast method provided in this disclosure may further include: establishing, by the session management network element for the terminal with the selected user plane network element supporting the multicast service, a session used for the multicast service.

With reference to the fifth aspect or the foregoing possible implementation, in a possible implementation, the multicast indication information may include a data network name or a multicast indication.

With reference to any one of the fifth aspect or the possible implementations, in a possible implementation, the receiving, by the session management network element, multicast indication information from a terminal or an access management network element may be specifically implemented as: receiving, by the session management network element, multicast joining information from the terminal or the access management network element, where the multicast indication information is the multicast joining information.

With reference to any one of the fifth aspect or the possible implementations, in a possible implementation, the multicast joining information includes a multicast address; and after the receiving, by the session management network element, multicast joining information from the terminal or the access management network element, the multicast method provided in this disclosure may further include: associating, by the session management network element, terminal information of the terminal with the multicast address into a preset correspondence; and sending, by the session management network element, the preset correspondence to a multicast function network element. In this way, the multicast function network element transmits the multicast data based on the preset correspondence from the access management network element to the multicast function network element.

With reference to any one of the fifth aspect or the possible implementations, in a possible implementation, the multicast joining information includes a multicast address; and after the receiving, by the session management network element, multicast joining information from the terminal or the access management network element, the multicast method provided in this disclosure may further include: associating, by the session management network element, connection information of the terminal with the multicast address into a preset correspondence; and sending, by the session management network element, the preset correspondence to a multicast function network element. In this way, the multicast function network element transmits the multicast data based on the preset correspondence from the access management network element to the multicast function network element.

For a process in which the multicast function network element transmits the multicast data based on the preset correspondence, refer to the specific implementation of the multicast method provided in the first aspect. Details are not described herein again.

Specifically, based on a connection relationship between network elements in the wireless network architecture, the sending, by the session management network element, the preset correspondence to a multicast function network element may be specifically implemented as: sending, by the session management network element, the preset correspondence to the multicast function network element by using the user plane network element.

If the multicast function network element is deployed inside the user plane network element in a centralized manner, the sending, by the session management network element, the preset correspondence to the multicast function network element by using the user plane network element is specifically implemented as: After a functional unit that is in the user plane network element and that interacts with the session management network element receives the preset correspondence, the functional unit sends the preset correspondence to the multicast function network element deployed in the user plane network element. If the multicast function network element is separately deployed in the wireless network and is connected to the user plane network element, the sending, by the user plane network element, the preset correspondence to the multicast function network element is specifically implemented as: After a functional unit that is in the user plane network element and that interacts with the session management network element receives the preset correspondence, the functional unit sends the preset correspondence to the multicast function network element connected to the user plane network element.

With reference to any one of the fifth aspect or the possible implementations, in a possible implementation, the terminal information of the terminal may include at least one of the following information; an address of the terminal, an identifier of the terminal, and an identifier of the session used by the terminal for multicast.

With reference to any one of the fifth aspect or the possible implementations, in a possible implementation, the connection information includes at least one of the following information; address information of a connection device on a connection corresponding to the connection information, identifier information of the connection device, and identifier information of the connection.

With reference to any one of the fifth aspect or the possible implementations, in a possible implementation, after the receiving, by the session management network element, multicast joining information from the terminal or the access management network element, the multicast method provided in this disclosure may further include: sending, by the session management network element, the multicast joining information to the multicast function network element. The session management network element sends the multicast joining information to the multicast function network element, so that the terminal sends the multicast joining information to the multicast function network element, and the multicast function network element receives the multicast joining information from the terminal.

The sending, by the session management network element, the multicast joining information to the multicast function network element is specifically implemented as: sending, by the session management network element, the multicast joining information to the multicast function network element by using the user plane network element. If the multicast function network element is deployed inside the user plane network element in a centralized manner, the sending, by the user plane network element, the multicast joining information to the multicast function network element is specifically implemented as: After the functional unit that is in the user plane network element and that interacts with the session management network element receives the multicast joining information, the functional unit sends the multicast joining information to the multicast function network element deployed in the user plane network element. If the multicast function network element is separately deployed in the wireless network and is connected to the user plane network element, the sending, by the user plane network element, the multicast joining information to the multicast function network element is specifically implemented as: After the functional unit that is in the user plane network element and that interacts with the session management network element receives the multicast joining information, the functional unit sends the multicast joining information to the multicast function network element connected to the user plane network element.

With reference to any one of the fifth aspect or the possible implementations, in a possible implementation, the receiving, by the session management network element, multicast indication information from a terminal or an access management network element includes: receiving, by the session management network element, a session establishment request from the terminal or the access management network element, where the session establishment request includes the multicast indication information.

It should be noted that, the multicast method provided in this disclosure is separately described from four perspectives, namely, the multicast function network element, the terminal, the access management network element, and the session management network element by using the multicast methods provided in the first aspect to the fifth aspect. For specific implementations of the aspects, refer to each other. Details are not described herein again.

According to a sixth aspect, a multicast apparatus is provided. The multicast apparatus may implement functions of the multicast function network element in the foregoing method examples. The functions may be implemented by hardware, or may be implemented by hardware executing corresponding software. The hardware or the software includes one or more modules corresponding to the foregoing functions.

With reference to the sixth aspect, in a possible implementation, a structure of the multicast apparatus includes a processor and a transceiver. The processor is configured to support the multicast apparatus in performing the corresponding functions of the multicast function network element in the foregoing methods. The transceiver is configured to support the multicast apparatus in communicating with another device. The multicast apparatus may further include a memory. The memory is configured to couple to the processor, and stores a program instruction and data that are necessary for the multicast apparatus.

According to a seventh aspect, another multicast apparatus is provided. The multicast apparatus may implement functions of the terminal in the foregoing method examples. The functions may be implemented by hardware, or may be implemented by hardware executing corresponding software. The hardware or the software includes one or more modules corresponding to the foregoing functions.

With reference to the seventh aspect, in a possible implementation, a structure of the multicast apparatus includes a processor and a transceiver. The processor is configured to support the multicast apparatus in performing the corresponding functions of the terminal in the foregoing methods. The transceiver is configured to support the multicast apparatus in communicating with another device. The multicast apparatus may further include a memory. The memory is configured to couple to the processor, and stores a program instruction and data that are necessary for the multicast apparatus.

According to an eighth aspect, still another multicast apparatus is provided. The multicast apparatus may implement functions of the access management network element in the foregoing method examples. The multicast apparatus may include: a receiving unit, configured to receive multicast indication information from a terminal; and a processing unit, configured to select, based on the multicast indication information received by the receiving unit, a session management network element supporting a multicast service.

The multicast apparatus provided in this disclosure receives the multicast indication information from the terminal, and selects the session management network element supporting the multicast service, to establish, for the terminal, a session used for the multicast service. In this way, multicast data can be sent to the terminal through the session that is established for the terminal and that is used for the multicast service, thereby transmitting the multicast data in a wireless network.

With reference to the eighth aspect, in a possible implementation, the processing unit may further be configured to establish, for the terminal with the selected session management network element supporting the multicast service, a session used for the multicast service.

With reference to the eighth aspect or the foregoing possible implementation, in a possible implementation, the multicast indication information may include a data network name or a multicast indication.

With reference to any one of the eighth aspect or the possible implementations, in a possible implementation, the receiving unit is specifically configured to receive multicast joining information from the terminal. In this implementation, the multicast indication information is the multicast joining information.

With reference to any one of the eighth aspect or the possible implementations, in a possible implementation, the multicast joining information includes a multicast address; the processing unit is further configured to associate terminal information of the terminal with the multicast address into a preset correspondence; and the multicast apparatus further includes a sending unit, configured to send the preset correspondence to a multicast function network element.

With reference to any one of the eighth aspect or the possible implementations, in a possible implementation, the multicast joining information includes a multicast address; the processing unit is further configured to associate connection information of the terminal with the multicast address into a preset correspondence; and the multicast apparatus further includes a sending unit, configured to send the preset correspondence to a multicast function network element.

With reference to any one of the eighth aspect or the possible implementations, in a possible implementation, the sending unit may further be configured to send the multicast joining information to the session management network element. The multicast joining information is sent to the session management network element, so that the session management network element sends the multicast joining information to a user plane network element, and the user plane network element sends the multicast joining information to the multicast function network element. In this way, the terminal sends the multicast joining information to the multicast function network element, and the multicast function network element receives the multicast joining information from the terminal.

With reference to any one of the eighth aspect or the possible implementations, in a possible implementation, the terminal information of the terminal includes at least one of the following information: an address of the terminal, an identifier of the terminal, and an identifier of the session used by the terminal for multicast. Identifier information of the session corresponding to the terminal may be an ID of the session established for the terminal. When a session ID can uniquely correspond to one terminal, the terminal information may be the ID of the session corresponding to the terminal. When a session ID does not uniquely correspond to one terminal, the session ID and the identifier of the terminal, or the session ID and identifier information of the terminal may be used as the terminal information.

With reference to any one of the eighth aspect or the possible implementations, in a possible implementation, the connection information includes at least one of the following information: address information of a connection device on a connection corresponding to the connection information, identifier information of the connection device, and identifier information of the connection.

With reference to any one of the eighth aspect or the possible implementations, in a possible implementation, the receiving unit is specifically configured to: receive a session establishment request from the terminal, where the session establishment request includes the multicast indication information; or receive a registration request from the terminal, where the registration request includes the multicast indication information.

According to a ninth aspect, still another multicast apparatus is provided. The multicast apparatus may implement functions of the access management network element in the foregoing method examples. The functions may be implemented by hardware, or may be implemented by hardware executing corresponding software. The hardware or the software includes one or more modules corresponding to the foregoing functions.

With reference to the ninth aspect, in a possible implementation, a structure of the multicast apparatus includes a processor and a transceiver. The processor is configured to support the multicast apparatus in performing the corresponding functions of the access management network element in the foregoing methods. The transceiver is configured to support the multicast apparatus in communicating with another device. The multicast apparatus may further include a memory. The memory is configured to couple to the processor, and stores a program instruction and data that are necessary for the multicast apparatus.

According to a tenth aspect, still another multicast apparatus is provided. The multicast apparatus may implement functions of the session management network element in the foregoing method examples. The multicast apparatus may include: a receiving unit, configured to receive multicast indication information from a terminal or an access management network element; and a processing unit, configured to select, based on the multicast indication information, a user plane network element supporting a multicast service.

The multicast apparatus provided in this disclosure receives the multicast indication information from the terminal or the access management network element, and selects the user plane network element supporting the multicast service, to establish, for the terminal, a session used for the multicast service. In this way, multicast data can be sent to the terminal through the session that is established for the terminal and that is used for the multicast service, thereby transmitting the multicast data in a wireless network.

With reference to the tenth aspect, in a possible implementation, the processing unit may further be configured to establish, for the terminal with the selected user plane network element supporting the multicast service, a session used for the multicast service.

With reference to the tenth aspect or the foregoing possible implementation, in a possible implementation, the multicast indication information may include a data network name or a multicast indication.

With reference to any one of the tenth aspect or the possible implementations, in a possible implementation, the receiving unit may be specifically configured to receive multicast joining information from the terminal or the access management network element, where the multicast indication information is the multicast joining information.

With reference to any one of the tenth aspect or the possible implementations, in a possible implementation, the multicast joining information includes a multicast address; the processing unit may further be configured to associate terminal information of the terminal with the multicast address into a preset correspondence; and the multicast apparatus may further include a sending unit, configured to send, to a multicast function network element, the preset correspondence obtained by the processing unit through association.

With reference to any one of the tenth aspect or the possible implementations, in a possible implementation, the multicast joining information includes a multicast address; the processing unit may further be configured to associate connection information of the terminal with the multicast address into a preset correspondence; and the multicast apparatus may further include a sending unit, configured to send, to a multicast function network element, the preset correspondence obtained by the processing unit through association.

With reference to any one of the tenth aspect or the possible implementations, in a possible implementation, the terminal information of the terminal may include at least one of the following information: an address of the terminal, an identifier of the terminal, and an identifier of the session used by the terminal for multicast.

With reference to any one of the tenth aspect or the possible implementations, in a possible implementation, the connection information includes at least one of the following information: address information of a connection device on a connection corresponding to the connection information, identifier information of the connection device, and identifier information of the connection.

With reference to any one of the tenth aspect or the possible implementations, in a possible implementation, the sending unit may further be configured to send the multicast joining information to the multicast function network element.

With reference to any one of the tenth aspect or the possible implementations, in a possible implementation, the receiving unit may be specifically configured to receive a session establishment request from the terminal or the access management network element, where the session establishment request includes the multicast indication information.

According to an eleventh aspect, still another multicast apparatus is provided. The multicast apparatus may implement functions of the session management network element in the foregoing method examples. The functions may be implemented by hardware, or may be implemented by hardware executing corresponding software. The hardware or the software includes one or more modules corresponding to the foregoing functions.

With reference to the eleventh aspect, in a possible implementation, a structure of the multicast apparatus includes a processor and a transceiver. The processor is configured to support the multicast apparatus in performing the corresponding functions of the session management network element in the foregoing methods. The transceiver is configured to support the multicast apparatus in communicating with another device. The multicast apparatus may further include a memory. The memory is configured to couple to the processor, and stores a program instruction and data that are necessary for the multicast apparatus.

According to a twelfth aspect, a computer storage medium is provided, and is configured to store a computer software instruction used by the foregoing multicast apparatus. The computer software instruction includes a program designed for performing any one of the first aspect to the fifth aspect or the possible implementations of the first aspect to the fifth aspect.

According to a thirteenth aspect, an embodiment of this disclosure provides a communications system, including the multicast apparatus according to any one of the sixth aspect or the possible implementations of the sixth aspect and the multicast apparatus according to any one of the seventh aspect or the possible implementations of the seventh aspect.

With reference to the thirteenth aspect, in a possible implementation, the multicast system may further include the multicast apparatus according to any one of the eighth aspect or the possible implementations of the eighth aspect or according to any one of the ninth aspect or the possible implementations of the ninth aspect and the multicast apparatus according to any one of the tenth aspect or the possible implementations of the tenth aspect or according to any one of the eleventh aspect or the possible implementations of the eleventh aspect.

According to a fourteenth aspect, a computer program product is provided, and is configured to store a computer software instruction used by the foregoing multicast apparatus. The computer software instruction includes a program designed for performing any one of the first aspect to the fifth aspect or the possible implementations of the first aspect to the fifth aspect.

The solutions provided in the sixth aspect to the fourteenth aspect are used to implement the multicast method provided in the first aspect, the third aspect, the fourth aspect, or the fifth aspect, and therefore can achieve the same beneficial effects as those in the first aspect, the third aspect, the fourth aspect, or the fifth aspect. Details are not described herein again.

BRIEF DESCRIPTION OF DRAWINGS

FIG. 6a-1 and FIG. 6a-2 are a schematic flowchart of still another multicast method according to an embodiment of this disclosure;

DESCRIPTION OF EMBODIMENTS

A multicast method described in this disclosure is applied to a wireless network, namely, a wireless communications system. With development of technologies, the wireless network has different standards. A standard type of the wireless network is not specifically limited in this disclosure. For example, the wireless network to which the multicast method described in this disclosure is applied may be a universal mobile telecommunications system (UMTS), a long term evolution (LTE) system, or a 5th generation mobile communications (5G) system. Examples are not enumerated one by one herein.

A terminal described in this disclosure is a mobile communications device used by a user. The terminal may be a mobile phone, a tablet computer, a notebook computer, an ultra-mobile personal computer (UMPC), a netbook, a personal digital assistant (PDA), an e-book, a mobile television, a wearable device, a personal computer (PC), a set top box (STB), a home television, a car, an unmanned aerial vehicle, or the like. In communications systems of different standards, the terminal may have different names, but all terminals having different names may be understood as the terminal described in this disclosure. A type of the terminal is not specifically limited in the embodiments of this disclosure either.

Figure 2:
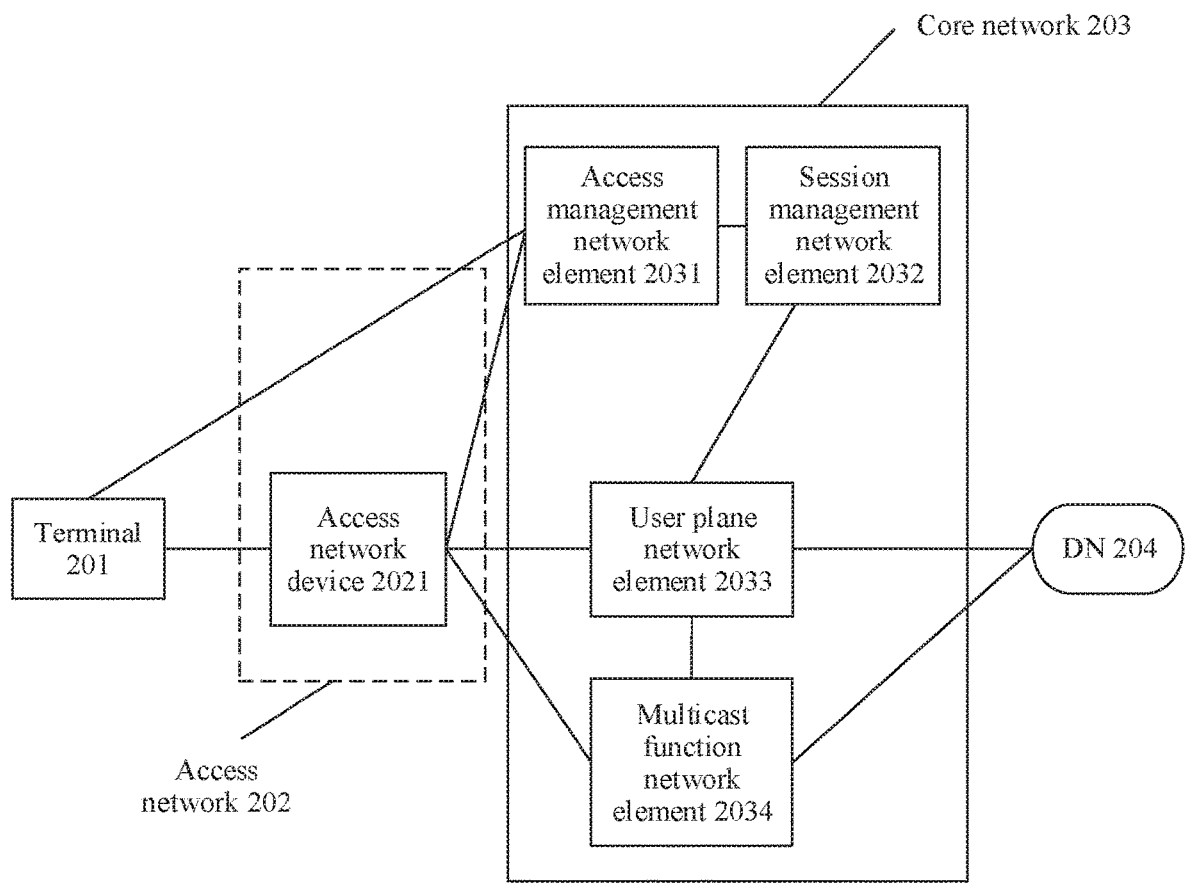
FIG. 2 is a schematic architectural diagram of a communications system according to an embodiment of this disclosure.
Figure 3:
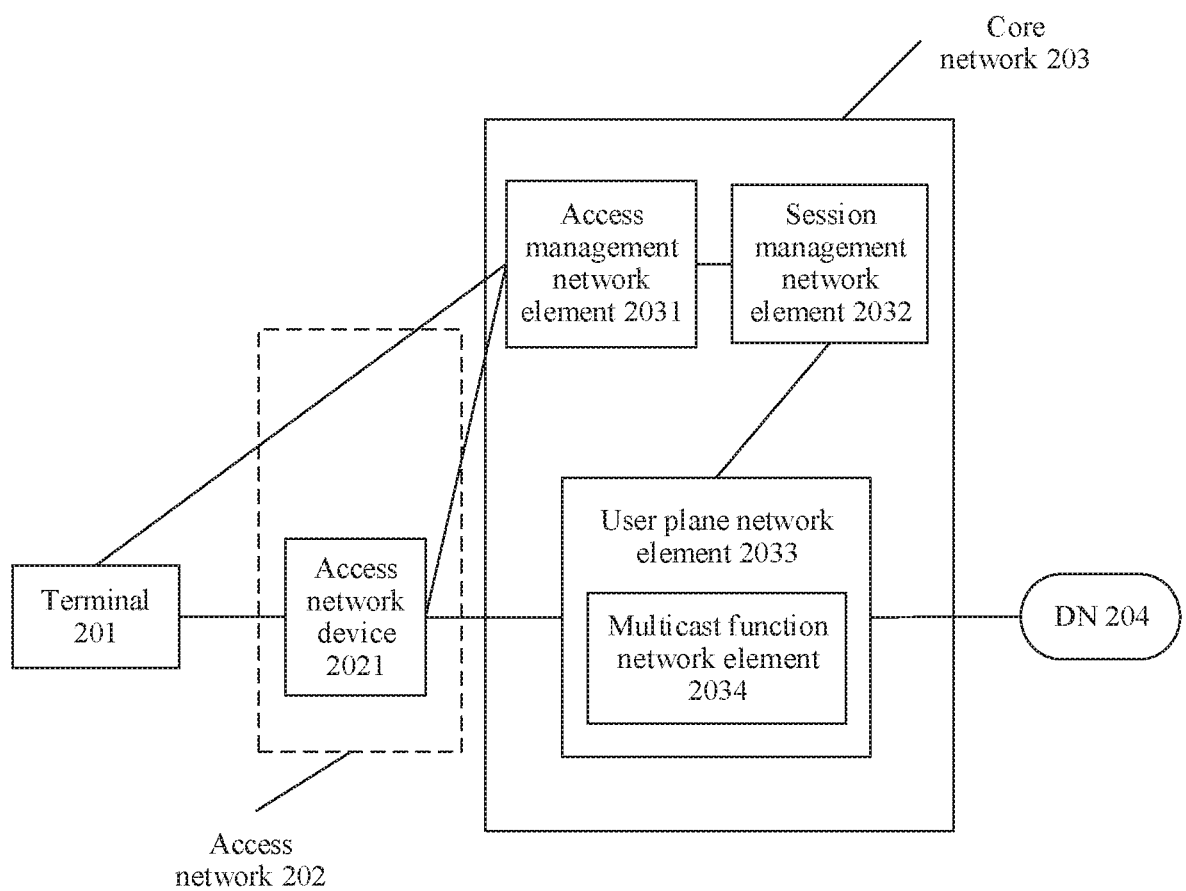
FIG. 3 is a schematic architectural diagram of another communications system according to an embodiment of this disclosure.

The multicast method provided in the embodiments of this disclosure is applied to a communications network shown in FIG. 2 or a communications network shown in FIG. 3. A difference between FIG. 2 and FIG. 3 lies in different deployment locations of a multicast function network element.

As shown in FIG. 2 or FIG. 3, the communications network includes a terminal 201, an access network 202, a core network 203, and a DN 204. In the communications network, the terminal 201 accesses the DN 204 through the access network 202 and the core network 203.

The access network 202 includes an access network device 2021. The core network 203 includes an access management network element 2031, a session management network element 2032, a user plane network element 2033, and a multicast function network element 2034.

Specifically, the access network device 2021 is responsible for connecting the terminal 201 to the core network 203. The access network device 2021 may be a NodeB (NB), an evolved NodeB (eNB), or a 5G-AN/5G-RAN node. The 5G-AN/5G-RAN node may be an access node, a next generation NodeB (gNB), a transmission and reception point (TRP), a transmission point (TP), or another access node. The access management network element 2031 is responsible for access management and mobility management. The session management network element 2032 is responsible for session management. Data may be transmitted between the terminal 201 and the DN 204 by using the access network device 2021 and the user plane network element 2033.

The network elements included in the communications network are connected through predefined interfaces for communication. This is not limited in the embodiments of this disclosure, and details are not described either.

It should be noted that in communications networks of different standards, the access network device 2021, the access management network element 2031, the session management network element 2032, and the user plane network element 2033 may each have different names, and network elements having similar functions all belong to the network elements described in this disclosure. Details are not described herein one by one. The communications network shown in FIG. 2 or FIG. 3 may be an LTE network, a universal mobile telecommunications system (UMTS) network, a 5G network, or another network. A type of a network to which the solutions of this disclosure are applied is not specifically limited in the embodiments of this disclosure.

For example, in the 5G network, the access network device 2021 may be a radio access network (RAN) device, the access management network element 2031 may be an access and mobility management function (AMF) network element, the session management network element 2032 may be a session management function (SMF) network element, and the user plane network element 2033 may be a UPF network element.

As shown in FIG. 2, the multicast function network element 2034 may be separately deployed. As shown in FIG. 3, the multicast function network element 2034 may be deployed in combination with the user plane network element 2033, for example, may be integrated into the user plane network element 2033. A deployment manner of the multicast function network element 2034 is not specifically limited in this disclosure.

In the embodiments of this disclosure, the word such as "example" or "for example" is used to represent giving an example, an illustration, or a description. Any embodiment or design scheme described as an "example" or "for example" in the embodiments of this disclosure should not be explained as being more preferred or having more advantages than another embodiment or design scheme. Exactly, use of the word such as "example" or "for example" is intended to present a related concept in a specific manner for ease of understanding.

In the embodiments of this disclosure, that a network element A in the communications network sends content C to a network element B may be that the network element A directly sends the content C to the network element B, or may be that the network element A forwards the content C level by level by using a network element between the network element A and the network element B. This process is not limited or detailed in the embodiments, and is configured based on an actual network architecture in an actual application.

The following describes in detail the embodiments of this disclosure with reference to the accompanying drawings.

Figure 4:
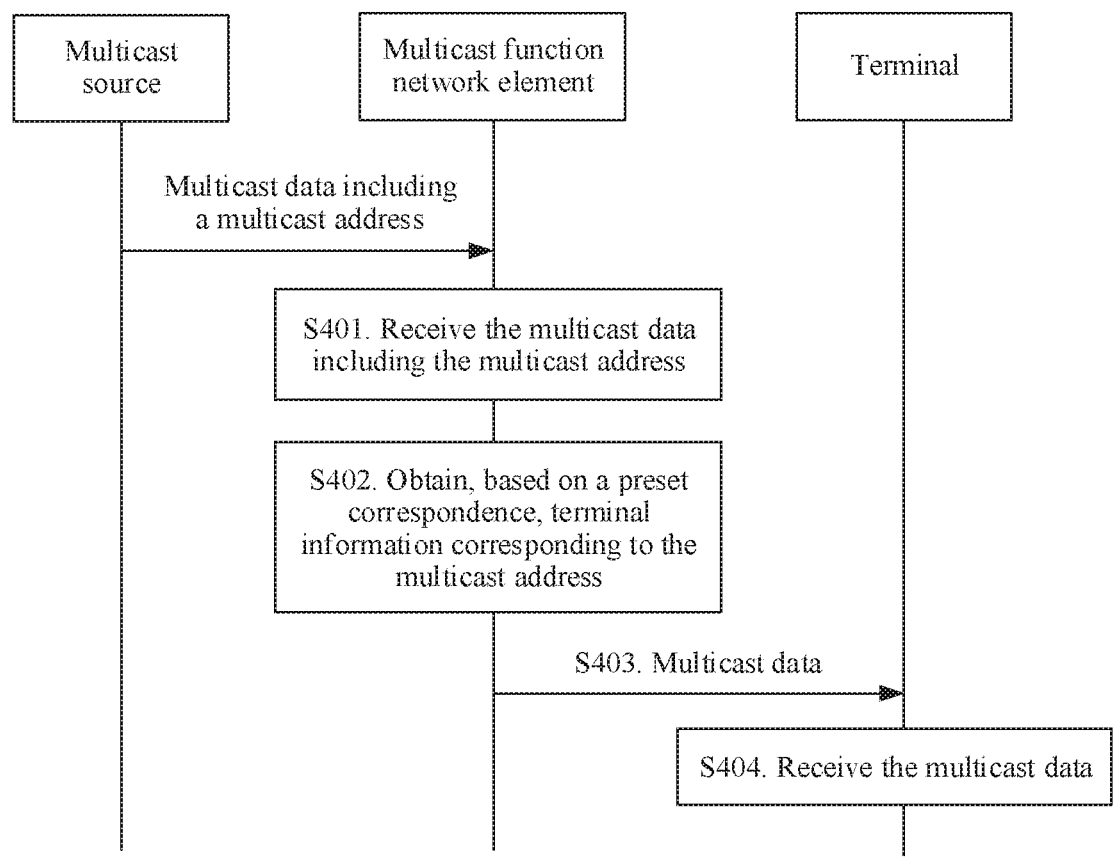
FIG. 4 is a schematic flowchart of a multicast method according to an embodiment of this disclosure.

According to an aspect, an embodiment of this disclosure provides a multicast method, applied to the communications network shown in FIG. 2 or FIG. 3. In this embodiment of this disclosure, the multicast method provided in the embodiments of this disclosure is described in detail by using an interaction process between network elements in the communications network. As shown in FIG. 4, the multicast method may include the following steps:

S401. A multicast function network element receives multicast data from a multicast source and that includes a multicast address.

The multicast source is a device that sends the multicast data.

Optionally, the multicast source may be a server or a network node in a DN accessed by a user by using a terminal through the communications network. A type of the multicast source is not specifically limited in this embodiment of this disclosure, and any source device that sends the multicast data in the DN is referred to as the multicast source in this embodiment of this disclosure.

Specifically, the multicast data is sent, based on the multicast address included in the multicast data, to a terminal joining a multicast group indicated by the multicast address.

S402. The multicast function network element obtains, based on a preset correspondence, terminal information corresponding to the multicast address.

The multicast address is an address of a multicast group that a terminal corresponding to the terminal information joins. The terminal information may be one type of information, or may be a plurality of types of information. A type and a form of the terminal information are not specifically limited in this embodiment of this disclosure. For example, the terminal information may include at least one of the following information: address information of the terminal, identifier information of the terminal, and identifier information of a session corresponding to the terminal. Optionally, the terminal information may uniquely correspond to one terminal.

The address information of the terminal is information corresponding to the terminal from an address perspective. For example, the address information of the terminal may be an IP address or an Ethernet address that is allocated to the terminal in the communications network, or other address information.

The identifier information of the terminal is information corresponding to the terminal from an ID perspective. For example, the identifier information of the terminal may be a user identifier (UID) allocated to the terminal in a global mobile network, or other identifier information.

The identifier information of the session corresponding to the terminal is information corresponding to the terminal from a perspective of an identifier of the session established for the terminal. For example, the identifier information of the session corresponding to the terminal may be a session ID of the session established for the terminal.

For example, when the address information of the terminal or the identifier information of the terminal may uniquely correspond to one terminal, the address information of the terminal or the identifier information of the terminal may be separately used as the terminal information.

For example, the session ID may be uniquely allocated by a network side to the terminal. In this case, the session ID may uniquely correspond to one terminal, and the identifier information of the session corresponding to the terminal may be separately used as the terminal information.

For example, the session ID may be named by the terminal. In this case, different terminals may have a same session ID, the session ID cannot uniquely correspond to one terminal, and the identifier information of the session corresponding to the terminal needs to be combined with other information to uniquely correspond to one terminal. In this case, the terminal information may be the identifier information of the session corresponding to the terminal and the address information of the terminal; or the terminal information may be the identifier information of the session corresponding to the terminal and the identifier information of the terminal.

Certainly, the foregoing examples describe content of the terminal information in detail only by using examples, and do not constitute a limitation on the terminal information. In an actual application, the content of the terminal information may be configured based on an actual requirement. Any information that can be used to determine the terminal belongs to the terminal information described in this disclosure.

Further, the preset correspondence may include a correspondence between the multicast address and the terminal information. The terminal corresponding to the terminal information joins the multicast group corresponding to the multicast address. From a perspective of transmission of the multicast data, the multicast data including the multicast address should be sent to the terminal corresponding to the terminal information corresponding to the multicast address in the preset correspondence.

The preset correspondence may include one multicast address and terminal information corresponding to the multicast address. For example, the preset correspondence may be represented as {multicast address 1, terminal information A}.

Certainly, the preset correspondence may alternatively include at least one multicast address and terminal information respectively corresponding to the at least one multicast address. An existence form of the preset correspondence is not specifically limited in this embodiment of this disclosure.

For example, as shown in Table 1, content of the preset correspondence is shown in a table form. The preset correspondence includes a plurality of multicast addresses and a plurality of pieces of terminal information respectively corresponding to the multicast addresses.

TABLE 1

| Multicast address | Terminal information |
|---|---|
| Multicast address 1 | Terminal information A |
| Multicast address 2 | Terminal information B |
| Multicast address 3 | Terminal information C |
| ... | ... |

For example, in S401, when the multicast function network element receives multicast data including the multicast address 2, in S402, the multicast function network element may obtain, based on the preset correspondence shown in Table 1, the terminal information B corresponding to the multicast address 2.

For example, one terminal may alternatively join a plurality of multicast groups, and the preset correspondence may include a plurality of multicast addresses corresponding to one piece of terminal information. Details are not described in this embodiment of this disclosure, provided that the preset correspondence reflects the correspondence between the terminal information and the multicast address.

Optionally, the preset correspondence may be established by the multicast function network element, or may be provided by another network element for the multicast function network element. This is not specifically limited in this embodiment of this disclosure. The following separately describes specific implementation of the two solutions.

First solution: The preset correspondence is established by the multicast function network element.

Figure 5:
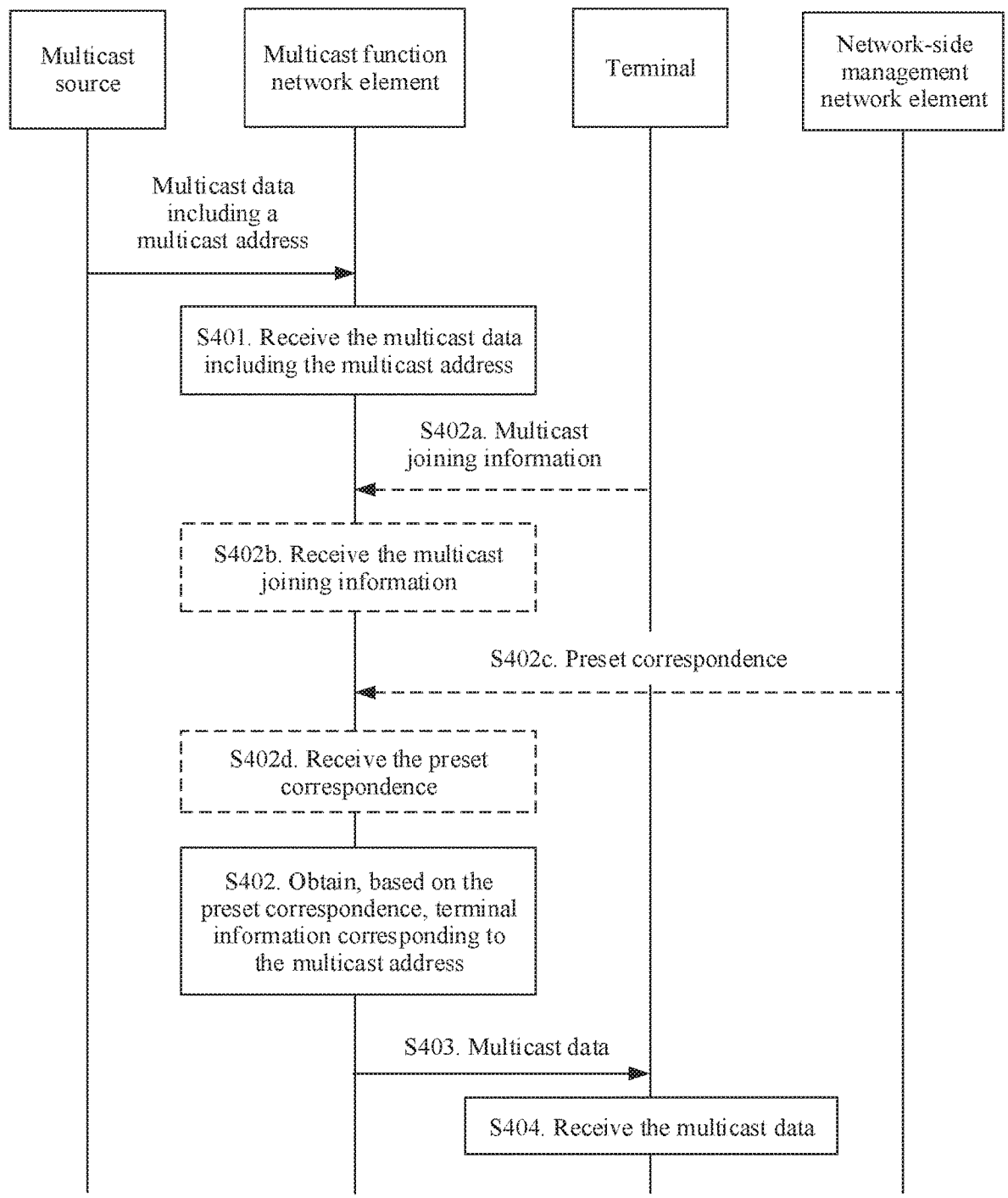
FIG. 5 is a schematic flowchart of another multicast method according to an embodiment of this disclosure.

In the first solution, as shown in FIG. 5, before S402, the multicast method provided in this embodiment of this disclosure may further include S402a and S402b.

S402a. The terminal sends multicast joining information to the multicast function network element.

The multicast joining information includes the multicast address, and is used to join the multicast group corresponding to the multicast address. A form and a sending moment of the multicast joining information are not specifically limited in this embodiment of this disclosure.

For example, the multicast joining information may be an existing internet group management protocol (IGMP) message. Certainly, for the multicast joining information, a message may alternatively be newly deployed to be specially used to send the multicast joining information.

Specifically, a specific implementation of S402a is different based on the moment at which the terminal sends the multicast joining information, and may include but is not limited to the following two implementations:

Implementation 1: The terminal sends the multicast joining information to the multicast function network element from a user plane.

In Implementation 1, after the session is established, the terminal communicates with a user plane network element on the user plane, to transmit user plane data and signaling.

Optionally, in Implementation 1, if the multicast function network element is deployed inside the user plane network element, that the terminal sends the multicast joining information to the multicast function network element from a user plane is specifically implemented as: The terminal sends the multicast joining information to an access network device; the access network device sends the multicast joining information to the user plane network element; and the multicast function network element in the user plane network element receives the multicast joining information from the terminal.

Optionally, in Implementation 1, if the multicast function network element is separately deployed, that the terminal sends the multicast joining information to the multicast function network element from a user plane is specifically implemented as: The terminal sends the multicast joining information to an access network device; the access network device sends the multicast joining information to the user plane network element; and the user plane network element further sends the multicast joining information to the multicast function network element.

It should be noted that, in a process in which the terminal sends the multicast joining information to the multicast function network element from the user plane, a transmission path of the multicast joining information depends on architecture deployment of the communications network. Details are not described in this embodiment of this disclosure. In different communications network architectures, the terminal sends the multicast joining information to the multicast function network element through level-by-level forwarding of a network element between the terminal and the multicast function network element. Briefly, the terminal sends the multicast joining information to the multicast function network element. In subsequent embodiments, similar descriptions are provided for a case in which specific content is transmitted between two network elements in the communications network, and detailed processes are not described one by one.

Implementation 2: The terminal sends the multicast joining information to the multicast function network element from a control plane.

In Implementation 2, in a registration process before the session is established, or in a session establishment process, the terminal sends the multicast joining information to the multicast function network element through level-by-level forwarding of a network-side management network element on the control plane between the terminal and the multicast function network element.

The network-side management network element may include an access management network element, a session management network element, or the like.

S402b. The multicast function network element receives the multicast joining information from the terminal.

Specifically, corresponding to the two implementations of sending the multicast joining information to the multicast function network element by the terminal in S402a, in S402b, a specific implementation of receiving, by the multicast function network element, the multicast joining information from the terminal also includes the following two implementations:

Implementation A: The multicast function network element receives, from the user plane, the multicast joining information from the terminal.

Implementation B: The multicast function network element receives, from the control plane, the multicast joining information from the terminal.

It should be noted that Implementation A and Implementation B in S402b correspond to Implementation 1 and Implementation 2 in S402a. Specific implementations of Implementation A and Implementation B are the same as those of Implementation 1 and Implementation 2. Details are not described herein again.

In S402b, the multicast function network element can obtain the multicast address of the multicast group that the terminal joins, namely, the multicast address included in the multicast joining information. In this way, the multicast function network element associates the multicast address of the multicast group that the terminal joins with the terminal information of the terminal into the content of the preset correspondence.

Further, optionally, when establishing the preset correspondence, the multicast function network element may obtain the terminal information of the terminal in a process of establishing the session with the terminal, or the terminal information of the terminal may be from the terminal to the multicast function network element when the terminal registers with the network. Alternatively, the multicast function network element may obtain the terminal information of the terminal in another manner. This is not specifically limited in this embodiment of this disclosure.

Further, optionally, if the multicast function network element obtains the terminal information in the process of establishing the session with the terminal, before S402, the multicast method provided in this embodiment of this disclosure may further include: establishing, by the multicast function network element, the session with the terminal.

For example, a session establishment request from the terminal may include the address information of the terminal or the identifier information of the terminal. When the terminal information is the address information of the terminal or the identifier information of the terminal, the multicast function network element can obtain the terminal information by using the received session establishment request.

For example, when the terminal information is the address information of the terminal, the session management network element allocates an address to the terminal when the multicast function network element establishes the session with the terminal. In this case, the terminal information can be obtained.

For example, when the terminal information is the identifier information of the session corresponding to the terminal, the session management network element allocates the identifier information to the session when the multicast function network element establishes the session with the terminal. In this case, the terminal information can be obtained.

Second solution: The preset correspondence is provided by another network element for the multicast function network element.

In the second solution, the another network element in the communications network constructs the preset correspondence, and sends the preset correspondence to the multicast function network element. Therefore, as shown in FIG. 5, before S402, the multicast method provided in this disclosure may further include S402c and S402d.

S402c. A network-side management network element sends the preset correspondence to the multicast function network element.

The network-side management network element may be an access management network element or a session management network element.

For example, the access management network element or the session management network element constructs the preset correspondence, and sends the preset correspondence to the multicast function network element.

Optionally, the network-side management network element may obtain, in a process of establishing the session for the terminal, the terminal information and the multicast address of the multicast group that the terminal joins, and construct the preset correspondence.

For example, a session establishment request from the terminal may include the address information of the terminal or the identifier information of the terminal. When the terminal information is the address information of the terminal or the identifier information of the terminal, the network-side management network element can obtain the terminal information by using the received session establishment request.

For example, when the terminal information is the address information of the terminal, the session management network element allocates an address to the terminal during session establishment.

For example, when the terminal information is the identifier information of the session corresponding to the terminal, the session management network element allocates the identifier information to the session during session establishment. In this case, the terminal information can be obtained.

S402d. The multicast function network element receives the preset correspondence from the network-side management network element.

It should be noted that the first solution and the second solution are parallel solutions, and only one solution needs to be selected and executed in an actual application.

S403. The multicast function network element sends the multicast data to the terminal corresponding to the terminal information.

Specifically, after obtaining the terminal information corresponding to the multicast address in S402, the multicast function network element learns of a destination terminal of the multicast data received in S401, and performs S403 to send the multicast data to the destination terminal.

In a possible implementation, S403 may be specifically implemented as: sending, by the multicast function network element, the multicast data to the terminal through the session corresponding to the terminal information.

In a possible implementation, S403 may be specifically implemented as: modifying, by the multicast function network element, a destination address of the multicast data to an address of the terminal corresponding to the terminal information; and sending, by the multicast function network element to the terminal, the multicast data whose destination address has been modified.

S404. The terminal receives the multicast data from the multicast function network element.

According to the multicast method provided in this disclosure, when receiving the multicast data, the multicast function network element obtains, based on the preset correspondence, the terminal information corresponding to the multicast address of the multicast data, and can send, based on the terminal information, the multicast data to the terminal corresponding to the terminal information, thereby transmitting the multicast data in a wireless network.

Figure 5A:
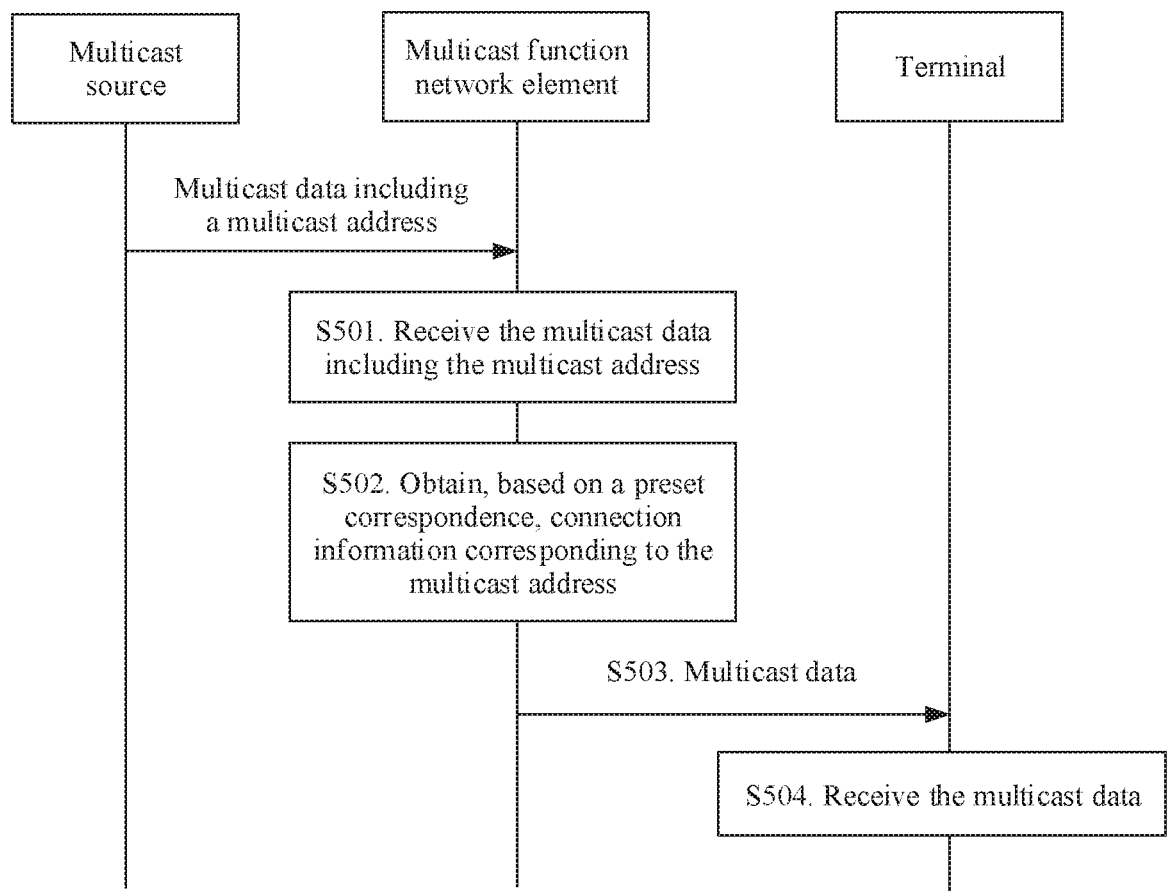
FIG. 5a is a schematic flowchart of still another multicast method according to an embodiment of this disclosure.

According to another aspect, an embodiment of this disclosure provides another multicast method, applied to the communications network shown in FIG. 2 or FIG. 3. In this embodiment of this disclosure, the multicast method provided in the embodiments of this disclosure is described in detail by using an interaction process between network elements in the communications network. As shown in FIG. 5a, the multicast method may include the following steps.

S501. A multicast function network element receives multicast data from a multicast source and that includes a multicast address.

It should be noted that a specific implementation of S501 is the same as that of S401, and details are not described herein again.

S502. The multicast function network element obtains, based on a preset correspondence, connection information corresponding to the multicast address.

A connection is a link for data transmission between a terminal and a DN, and the connection information is information used to indicate the link. Specific content of the connection information may be defined based on an actual requirement. This is not specifically limited in this disclosure. In a possible implementation, one piece of connection information may uniquely correspond to one terminal. Therefore, the connection information of the terminal is defined as connection information of a connection to which the terminal belongs.

A connection device is deployed on a connection between the multicast function network element and the terminal, and the multicast function network element sends the multicast data to the terminal on the connection by using the connection device. The multicast address is an address of a multicast group that the terminal corresponding to connection information joins. The connection information may be one type of information, or may be a plurality of types of information. A type and a form of the connection information are not specifically limited in this embodiment of this disclosure. For example, the connection information includes at least one of the following information: address information of the connection device on the connection corresponding to the connection information, identifier information of the connection device, and identifier information of the connection. In a possible implementation, the connection information may uniquely correspond to one connection, and the connection is used to transmit the multicast data between the terminal and the DN.

The address information of the connection device is information corresponding to the connection from an address perspective. For example, the address information of the connection device may be an IP address or an Ethernet address that is allocated to the connection device in the communications network, or other address information.

The identifier information of the connection device is information corresponding to the connection from an ID perspective. For example, the identifier information of the connection may be an identification symbol allocated to the connection device in the network.

For example, the connection information may be N3 tunnel information. For example, the connection device may be a tunnel endpoint device such as an NG-RAN device or a UPF network element. This is not specifically limited in this disclosure.

Certainly, the foregoing examples describe content of the connection information in detail only by using examples, and do not constitute a limitation on the connection information. In an actual application, the content of the connection information may be configured based on an actual requirement. Any information that can be used to determine the connection belongs to the connection information described in this disclosure.

Further, the preset correspondence may include a correspondence between the multicast address and the connection information. The terminal accessing the connection corresponding to the connection information joins the multicast group corresponding to the multicast address. From a perspective of transmission of the multicast data, the multicast data including the multicast address should be sent to the terminal accessing the connection corresponding to the connection information corresponding to the multicast address in the preset correspondence.

The preset correspondence may include one multicast address and connection information corresponding to the multicast address. For example, the preset correspondence may be represented as {multicast address 1, connection information A}.

Certainly, the preset correspondence may alternatively include at least one multicast address and connection information respectively corresponding to the at least one multicast address. An existence form of the preset correspondence is not specifically limited in this embodiment of this disclosure.

For example, as shown in Table 2, content of the preset correspondence is shown in a table form. The preset correspondence includes a plurality of multicast addresses and a plurality of pieces of connection information respectively corresponding to the multicast addresses.

TABLE 2

| Multicast address | Connection information |
|---|---|
| Multicast address 4 | Connection information E |
| Multicast address 5 | Connection information F |
| Multicast address 6 | Connection information G |
| ... | ... |

For example, in S501, when the multicast function network element receives multicast data including the multicast address 5, in S502, the multicast function network element may obtain, based on the preset correspondence shown in Table 2, the connection information F corresponding to the multicast address 5.

Optionally, the preset correspondence may be established by the multicast function network element, or may be provided by another network element for the multicast function network element. This is not specifically limited in this embodiment of this disclosure. For a specific implementation thereof, refer to the first solution and the second solution that are described in S402, and a difference is that the preset correspondence in S402 includes the terminal information, and the preset correspondence in S502 herein includes the connection information of the terminal.

S503. The multicast function network element sends the multicast data to the terminal through the connection corresponding to the connection information.

Specifically, after obtaining the connection information corresponding to the multicast address in S502, the multicast function network element learns of the connection for transmitting the multicast data received in S501, and performs S503 to send the multicast data to the terminal accessing the connection.

In a possible implementation, S503 may be specifically implemented as: sending, by the multicast function network element, the multicast data to the terminal through the connection corresponding to the connection information.

In a possible implementation, S503 may be specifically implemented as: modifying, by the multicast function network element, a destination address of the multicast data to an address of the terminal accessing the connection corresponding to the connection information; and sending, by the multicast function network element to the terminal through the connection corresponding to the connection information, the multicast data whose destination address has been modified.

S504. The terminal receives the multicast data from the multicast function network element.

According to the multicast method provided in this disclosure, when receiving the multicast data, the multicast function network element obtains, based on the preset correspondence, the connection information corresponding to the multicast address of the multicast data, and can send, based on the connection information, the multicast data to the terminal accessing the connection corresponding to the connection information, thereby transmitting the multicast data in a wireless network.

According to another aspect, an embodiment of this disclosure provides another multicast method, applied to the communications network shown in FIG. 2 or FIG. 3. In this embodiment of this disclosure, the multicast method provided in this disclosure is described in detail by using an interaction process between network elements in the communications network. Different from the previous embodiment, this embodiment further describes, on the basis of the transmission process of multicast data that is described in the previous embodiment, a process of establishing a session for a terminal.

As shown in FIG. 6A and FIG. 6B or FIG. 6a-1 and FIG. 6a-2, the multicast method provided in this embodiment of this disclosure may include the following steps.

S601. The terminal sends multicast indication information to an access management network element.

The multicast indication information is used to establish a session used for a multicast service.

Optionally, in S601, that a terminal sends multicast indication information to an access management network element may include but is not limited to the following two implementations:

First implementation: The terminal sends a session establishment request to the access management network element, where the session establishment request includes the multicast indication information.

Optionally, in the first implementation, the session establishment request may include address information of the terminal or identifier information of the terminal, and is used to obtain terminal information of the terminal.

Optionally, in the first implementation, the session establishment request may include connection information of a connection accessed by the terminal, and is used to obtain the connection information of the terminal.

Second implementation: The terminal sends a registration request to the access management network element, where the registration request includes the multicast indication information.

Further, content of the multicast indication information may be configured based on an actual requirement. This is not specifically limited in this embodiment of this disclosure.

Optionally, the multicast indication information may include a data network name or a multicast indication.

The data network name or the multicast indication may be preconfigured as the multicast indication information. When the terminal sends the data network name or the multicast indication, the terminal sends the multicast indication information. The data network name may be a name of a data network having a multicast function. The multicast indication may be functional code, or may be a dedicated character or character string. This is not specifically limited in this embodiment of this disclosure. The data network name and the multicast indication may be configured based on an actual requirement, provided that the data network name and the multicast indication can be identified as the multicast indication information by both the terminal and a network element on a network side.

S602. The access management network element receives the multicast indication information from the terminal.

The access management network element may receive, by using an access network device, the multicast indication information from the terminal.

It should be noted that, corresponding to the two implementations of sending the multicast indication information by the terminal in S601, there may also be two implementations of receiving the multicast indication information by the access management network element in S602. The two implementations include: receiving the session establishment request including the multicast indication information, or receiving the registration request including the multicast indication information. Details are not described herein again.

S603. The access management network element selects, based on the multicast indication information, a session management network element supporting the multicast service.

Specifically, the multicast indication information is used to instruct to establish the session used for the multicast service. Therefore, when receiving the multicast indication information, the access management network element selects the session management network element supporting the multicast service, so that the established session supports the multicast service.

For example, whether the session management network element supports the multicast service may be reflected by using a preset field in an interactive message. In an initial phase of network establishment, the access management network element obtains whether each session management network element supports the multicast service. Alternatively, the access management network element may send a request message to a session management network element connected to the access management network element, to request to obtain whether the session management network element supports the multicast service; and select, by using response content of the session management network element, the session management network element supporting the multicast service. An implementation of identifying whether the session management network element supports the multicast service is not specifically limited in this embodiment of this disclosure.

It should be noted that, if the second implementation is used in S601, that is, the terminal sends the registration request to the access management network element, where the registration request includes the multicast indication information, after S603 and before S604, the multicast method provided in this embodiment of this disclosure further includes: sending, by the terminal, a session establishment request to the access management network element. This step is not shown in FIG. 6A and FIG. 6B or FIG. 6a-1 and FIG. 6a-2. Optionally, the session establishment request may include the address information of the terminal or the identifier information of the terminal that is used as the terminal information of the terminal in the preset correspondence. Optionally, the session establishment request may include the connection information of the terminal that is used in the preset correspondence.

S604. The access management network element sends, to the session management network element supporting the multicast service, the session establishment request including the multicast indication information.

Optionally, the session establishment request from the access management network element in S604 may further include the address information of the terminal or the identifier information of the terminal, and is used to obtain the terminal information of the terminal.

Optionally, the session establishment request from the access management network element in S604 may further include the connection information of the terminal.

S605. The session management network element receives the session establishment request including the multicast indication information.

It should be noted that the session management network element in S605 is the session management network element that supports the multicast service and that is selected by the access management network element in S603. The session establishment request received by the session management network element in S605 is the session establishment request from the access management network element in S604.

Specifically, based on an architecture of the communications network, the multicast indication information that is received by the session management network element from the terminal in S605 is the multicast indication information in the session establishment request, in S604, by the access management network element to the session management network element supporting the multicast service. The multicast indication information is forwarded by the access management network element to the session management network element after being from the terminal to the access management network element. Therefore, this may be briefly described as: the session management network element receives the multicast indication information from the terminal; or may be briefly described as: the session management network element receives the multicast indication information from the access management network element.

S606. The session management network element selects, based on the multicast indication information, a user plane network element supporting the multicast service.

Specifically, the multicast indication information is used to instruct to establish the session used for the multicast service. Therefore, when receiving the multicast indication information, the session management network element selects the user plane network element supporting the multicast service, so that the established session supports the multicast service.

For example, the user plane network element supporting the multicast service is a user plane network element in which a multicast function network element is deployed, or a user plane network element that cooperates with an independently deployed multicast function network element.

For example, whether the user plane network element supports the multicast service may be reflected by using a preset field in an interactive message. In the initial phase of network establishment, the session management network element obtains whether the user plane network element supports the multicast service. Alternatively, the session management network element may send a request message to a user plane network element connected to the session management network element, to request to obtain whether the user plane network element supports the multicast service; and select, by using response content of the user plane network element, the user plane network element supporting the multicast service. An implementation of identifying whether the user plane network element supports the multicast service is not specifically limited in this embodiment of this disclosure.

S607. The session management network element sends a session establishment request message to the multicast function network element by using the user plane network element supporting the multicast service.

In a possible implementation, the session establishment request message from the session management network element in S607 may not include the multicast indication information.

In a possible implementation, the session establishment request message from the session management network element in S607 may alternatively include the multicast indication information, to instruct to perform the multicast service through the session established this time, so that the user plane network element or the multicast function network element enables a multicast function. In this way, the user plane network element or the multicast function network element only needs to determine whether a specific session is used to transmit multicast data, thereby improving data transmission efficiency.

Optionally, the session establishment request from the session management network element in S607 may further include the address information of the terminal or the identifier information of the terminal, and is used to obtain the terminal information of the terminal.

Optionally, the session establishment request from the session management network element in S607 may further include the connection information of the terminal.

It should be noted that if the multicast function network element is deployed inside the user plane network element, in S607, when the session management network element sends the session establishment request to the user plane network element supporting the multicast service, the multicast function network element receives the session establishment request. If the multicast function network element is separately deployed, S607 is specifically implemented as: The session management network element sends the session establishment request to the user plane network element, and the user plane network element sends the session establishment request to the multicast function network element.

It should be noted that FIG. 6A and FIG. 6B or FIG. 6a-1 and FIG. 6a-2 show only the case in which the multicast function network element is separately deployed, but does not constitute a limitation on the case in which the multicast function network element is deployed inside the user plane network element.

S608. The multicast function network element establishes the session with the terminal.

The session established in S608 is the session that the multicast indication information is used to instruct to establish and that is used for the multicast service. In a process of S608, the multicast function network element may obtain the terminal information or the connection information of the terminal.

Specifically, if the terminal information is the address information of the terminal, in a session establishment process, the session management network element allocates an address to the terminal, and sends the allocated address information to the user plane network element and the terminal. If the terminal information is the identifier information of the terminal or the address information of the terminal, the session establishment request from the terminal includes the identifier information of the terminal or the address information of the terminal. If the terminal information is a session ID corresponding to the terminal, in a session establishment process, the session management network element allocates the session ID to the established session, and sends the allocated session ID to the user plane network element.

Specifically, if the connection information is address information of a connection device, in a session establishment process, the session management network element allocates an address to the connection device on the connection accessed by the terminal, and sends the allocated address information to the user plane network element and the terminal. If the connection information is identifier information of a connection device or address information of a connection device, the session establishment request from the terminal includes the identifier information or the address information of the connection device on the connection accessed by the terminal. If the connection information is identifier information of the connection, in a session establishment process, the session management network element allocates a session ID to the established session, and sends the allocated session ID to the user plane network element.

Specifically, in S608, a control plane network element (for example, the session management network element or the access management network element) between the multicast function network element and the terminal establishes the session between the multicast function network element and the terminal through message exchange. The process is the same as an existing session establishment process, and details are not described herein.

After the session is established, the terminal enters a data transmission phase, and performs S609 to join a multicast group.

S609. The terminal sends multicast joining information to the multicast function network element.

The multicast joining information includes the multicast address, and is used by the terminal to join a multicast group corresponding to the multicast address.

S610. The multicast function network element receives the multicast joining information from the terminal.

Specifically, in S610, the multicast function network element receives the multicast joining information from a user plane, to obtain the multicast address, and associates the multicast address with the terminal information or the connection information of the terminal that is obtained in S608, to form a preset correspondence. The formation of the preset correspondence has been described in detail in the previous embodiment, and details are not described herein again. The preset correspondence also has been described in detail in the previous embodiment, and details are not described herein again.

Figure 6A:
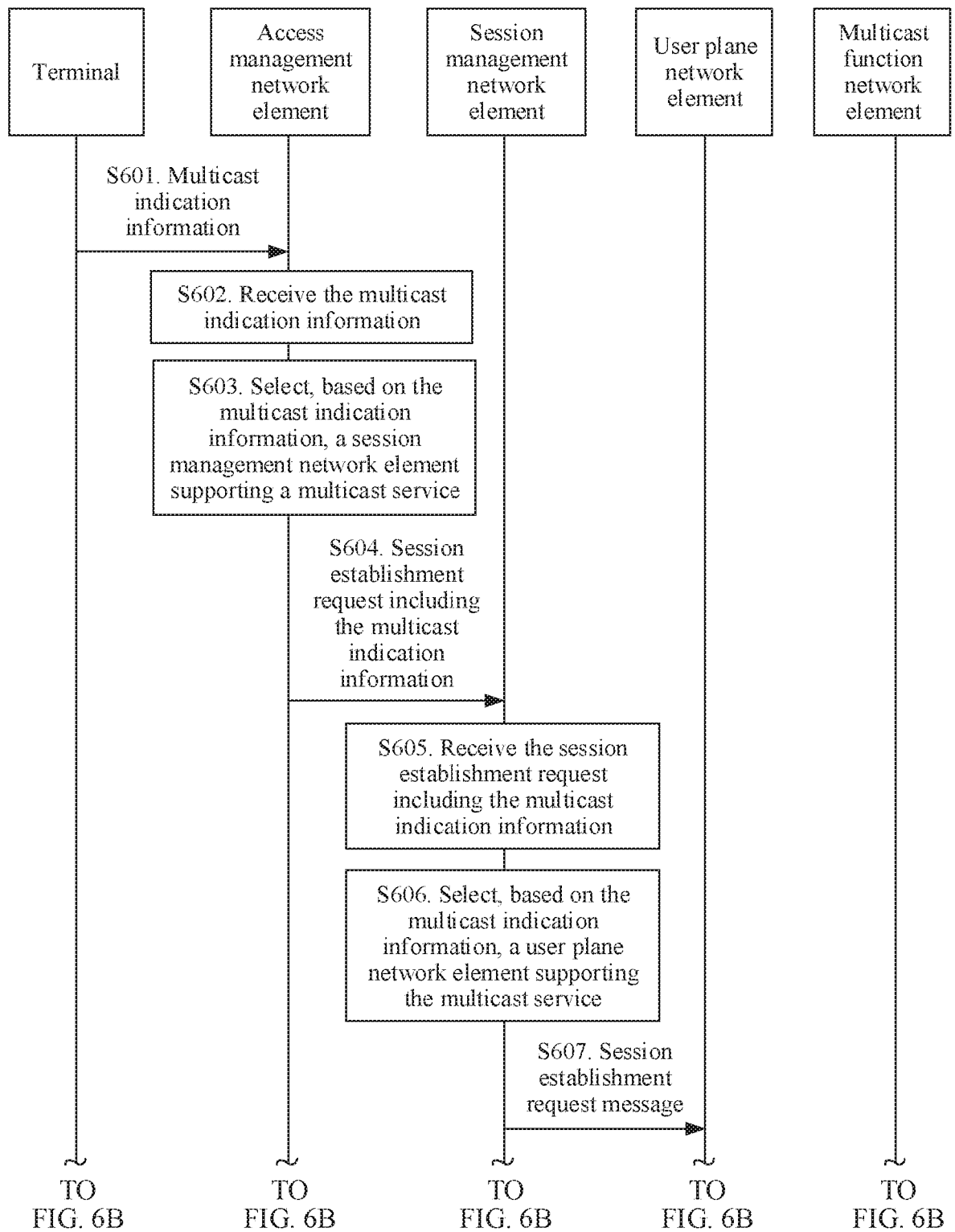
FIG. 6A and FIG. 6B are a schematic flowchart of still another multicast method according to an embodiment of this disclosure.
Figure 6B:
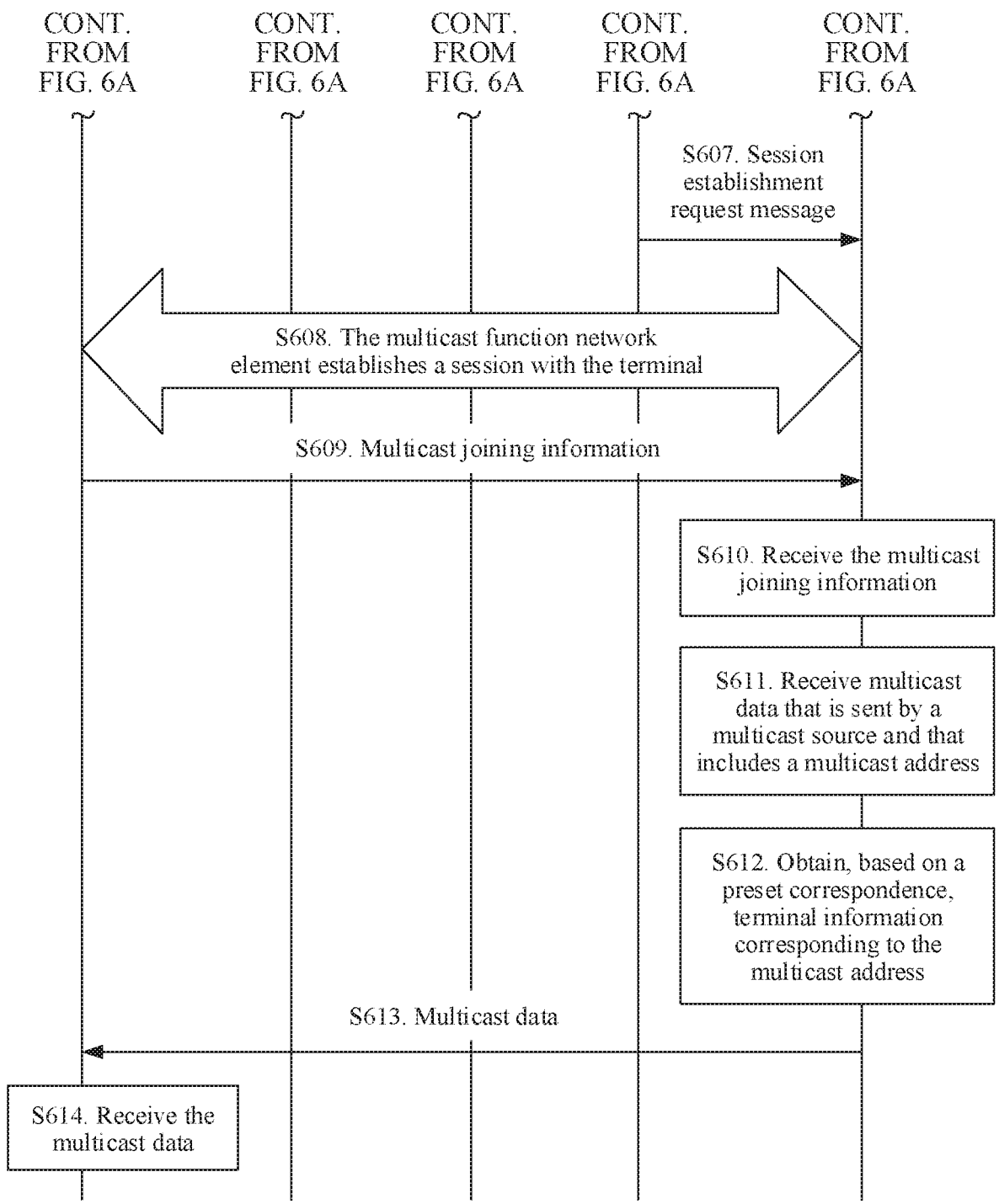
Figures 1, 6A:
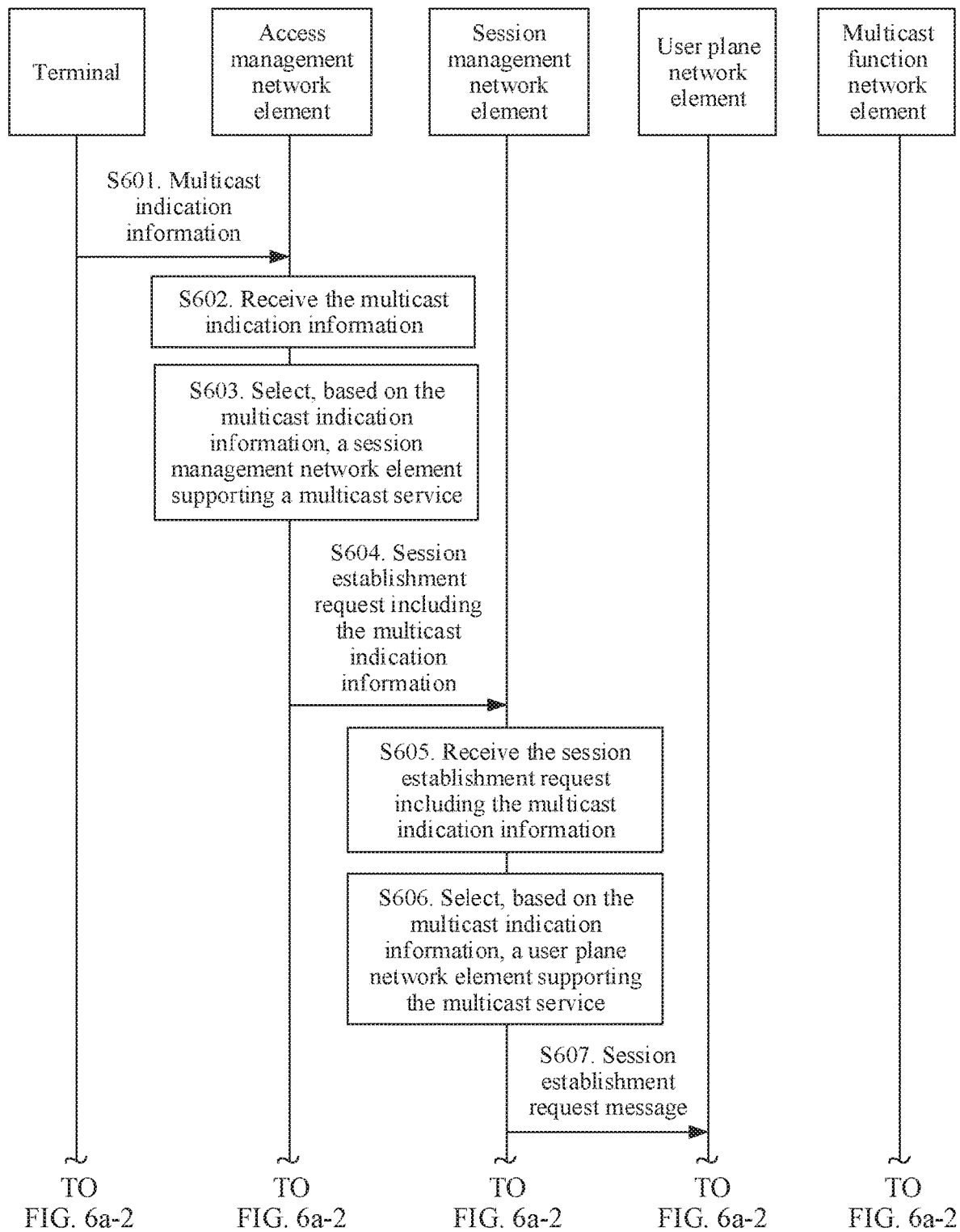
Figures 2, 6A:
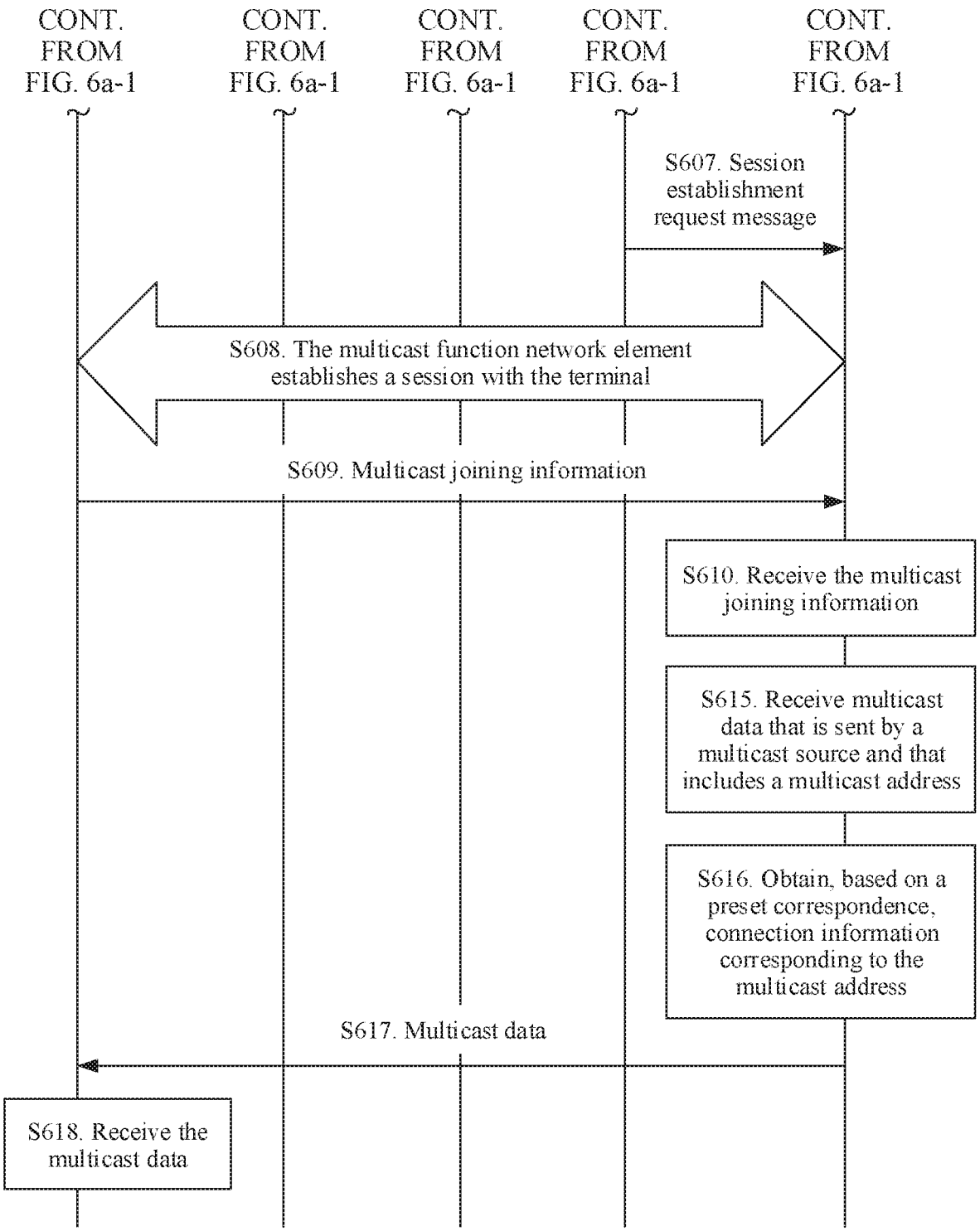

Further, optionally, as shown in FIG. 6A and FIG. 6B, after S610, S611 to S614 are performed to transmit the multicast data between the multicast function network element and the terminal.

S611. The multicast function network element receives the multicast data from a multicast source and that includes the multicast address.

S612. The multicast function network element obtains, based on the preset correspondence, the terminal information corresponding to the multicast address.

S613. The multicast function network element sends the multicast data to the terminal corresponding to the terminal information.

It should be noted that processes of S611 to S613 are the same as of the processes described in S401 to S403, and details are not described herein again.

S614. The terminal receives the multicast data from the multicast function network element.

In S614, the terminal receives the multicast data from the multicast function network element through the session used for the multicast service. Optionally, a destination address of the multicast data received by the terminal may be the address of the terminal.

Figure 1:
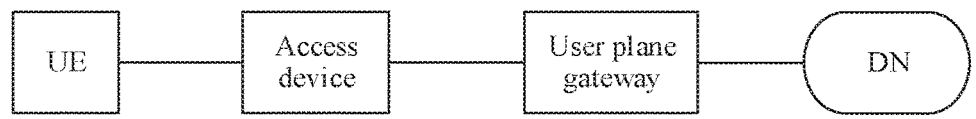
FIG. 1 is a structural diagram of a user plane architecture of a wireless network in the prior art.

Further, optionally, as shown in FIG. 6a-1 and FIG. 6a-2, after S610, S615 to S618 are performed to transmit the multicast data between the multicast function network element and the terminal.

S615. The multicast function network element receives the multicast data from a multicast source and that includes the multicast address.

S616. The multicast function network element obtains, based on the preset correspondence, the connection information corresponding to the multicast address.

S617. The multicast function network element sends the multicast data to the terminal through the connection corresponding to the connection information.

It should be noted that processes of S615 to S617 are the same as the processes described in S501 to S503, and details are not described herein again.

S618. The terminal receives the multicast data from the multicast function network element.

In S618, the terminal receives the multicast data from the multicast function network element through the session used for the multicast service. Optionally, a destination address of the multicast data received by the terminal may be the address of the terminal.

According to still another aspect, an embodiment of this disclosure provides yet another multicast method, applied to the communications network shown in FIG. 2 or FIG. 3. In this embodiment of this disclosure, the multicast method provided in this disclosure is described in detail by using an interaction process between network elements in the communications network. The same as the previous embodiment, this embodiment further describes, on the basis of the transmission process of multicast data, a process of establishing a session for a terminal. A difference from the previous embodiment is that multicast indication information in this embodiment is multicast joining information.

Figure 7:
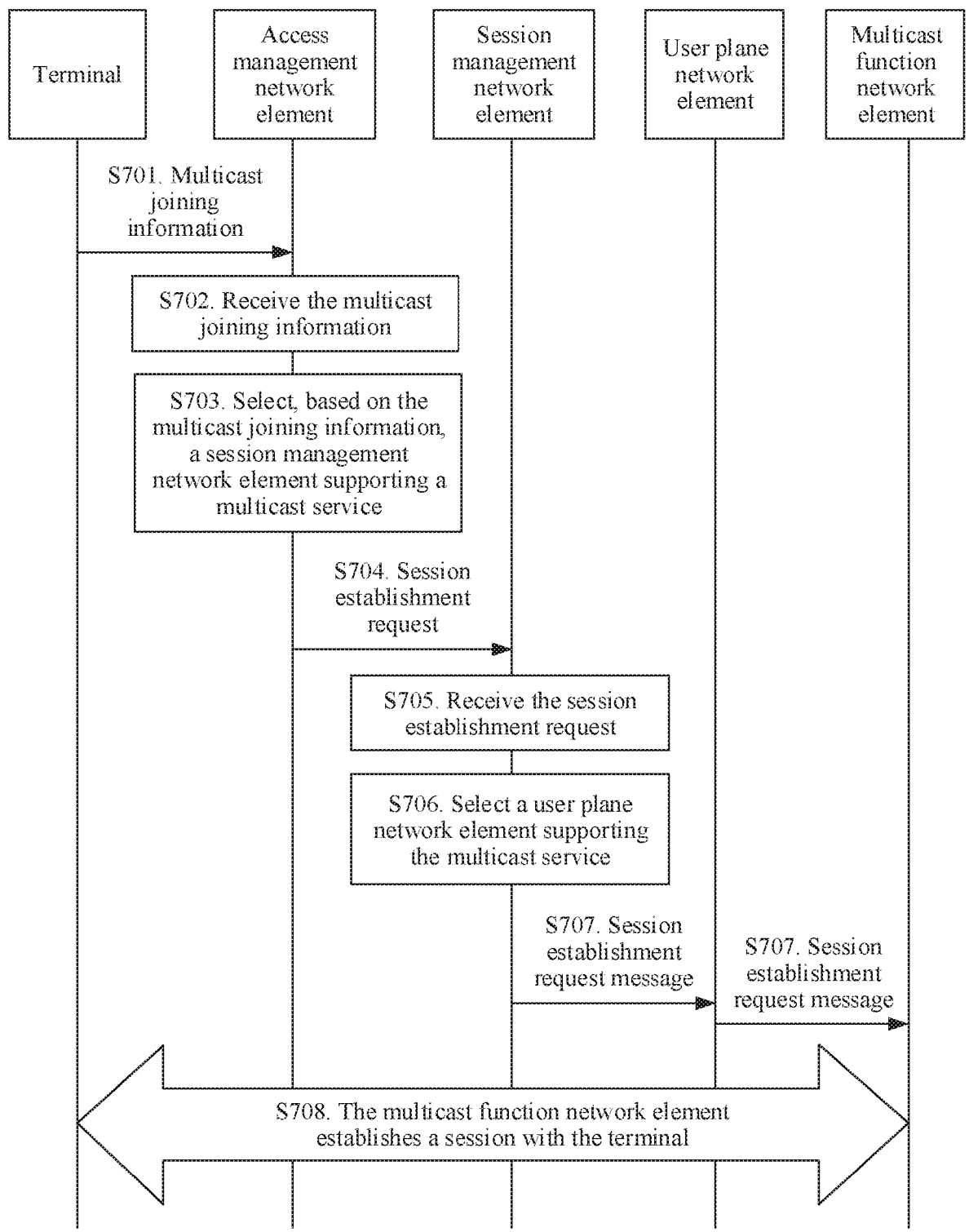
FIG. 7 is a schematic flowchart of yet another multicast method according to an embodiment of this disclosure.

As shown in FIG. 7, the multicast method provided in this embodiment of this disclosure may include the following steps.

S701. The terminal sends the multicast joining information to an access management network element.

A multicast indication is used to establish a session used for a multicast service. In S701, the multicast joining information includes a multicast address of a multicast group that the terminal is to join.

Optionally, in S701, the sending, by the terminal, the multicast joining information to an access management network element may be implemented as: sending, by the terminal, a session establishment request including the multicast joining information to the access management network element; or sending, by the terminal, a registration request including the multicast joining information to the access management network element.

Optionally, in S701, if the sending, by the terminal, the multicast joining information to an access management network element is implemented as the sending, by the terminal, a session establishment request including the multicast joining information to the access management network element, the session establishment request may include address information of the terminal or identifier information of the terminal, and is used to obtain terminal information of the terminal.

Optionally, in S701, if the sending, by the terminal, the multicast joining information to an access management network element is implemented as the sending, by the terminal, a session establishment request including the multicast joining information to the access management network element, the session establishment request may include connection information of the terminal.

It should be noted that, a specific implementation of sending the multicast joining information to the access management network element by the terminal in S701 is the same as the specific implementation of sending the multicast indication information to the access management network element by the terminal in S601, but sent content is different. Therefore, for the specific implementation of S701, refer to the specific implementation of S601, and details are not described herein again.

S702. The access management network element receives the multicast joining information from the terminal.

It should be noted that a specific implementation of receiving, by the access management network element, the multicast joining information from the terminal in S702 is the same as the specific implementation of receiving, by the access management network element, the multicast indication information from the terminal in S602, but received content is different. Therefore, for the specific implementation of S702, refer to the specific implementation of S602, and details are not described herein again.

S703. The access management network element selects, based on the multicast joining information, a session management network element supporting a multicast service.

It should be noted that, the multicast joining information in S703 is used as multicast indication information, and a function of the multicast joining information is the same as a function of the multicast indication information in S603. A specific implementation of selecting, by the access management network element based on the multicast joining information, the session management network element supporting the multicast service in S703 is the same as the specific implementation of selecting, by the access management network element based on the multicast indication information, the session management network element supporting the multicast service in S603, but referenced content is different. Therefore, for the specific implementation of S703, refer to the specific implementation of S603, and details are not described herein again.

It should be noted that, in S701, if the terminal sends a registration request including the multicast joining information to the access management network element, after S703 and before S704, the multicast method provided in this embodiment of this disclosure further includes: sending, by the terminal, a session establishment request to the access management network element. This step is not shown in FIG. 7. Optionally, the session establishment request may include the address information of the terminal or the identifier information of the terminal that is used as the terminal information of the terminal in a preset correspondence. Optionally, the session establishment request may include address information or identifier information that is of a connection device on a connection accessed by the terminal and that is used as the connection information of the terminal in a preset correspondence.

S704. The access management network element sends a session establishment request to the session management network element supporting the multicast service.

Optionally, in S704, the access management network element may send the session establishment request including the multicast joining information to the session management network element supporting the multicast service, and the session establishment request is used to instruct the session management network element to establish the session used for the multicast service.

Optionally, the session establishment request from the access management network element in S704 may further include the address information of the terminal or the identifier information of the terminal, and is used to obtain the terminal information of the terminal. Optionally, the session establishment request from the access management network element in S704 may further include the address information or the identifier information of the connection device on the connection accessed by the terminal, and is used to obtain the connection information of the terminal.

Optionally, in S704, the access management network element may obtain, as the terminal information, the address information or the identifier information of the terminal that is included in the session establishment request from the terminal, and associate the terminal information of the terminal with the multicast address included in the multicast joining information into the preset correspondence. On the basis of sending the session establishment request to the session management network element supporting the multicast service, the access management network element may further send the preset correspondence to the session management network element supporting the multicast service. Optionally, the preset correspondence may be included in the session establishment request for sending, or the preset correspondence may be from using an independent message. This is not specifically limited in this embodiment of this disclosure.

Optionally, in S704, the access management network element may obtain, as the connection information of the terminal, the address information or the identifier information of the connection device on the connection accessed by the terminal that is included in the session establishment request from the terminal, and associate the connection information of the terminal with the multicast address included in the multicast joining information into the preset correspondence. On the basis of sending the session establishment request to the session management network element supporting the multicast service, the access management network element may further send the preset correspondence to the session management network element supporting the multicast service. Optionally, the preset correspondence may be included in the session establishment request for sending, or the preset correspondence may be from using an independent message. This is not specifically limited in this embodiment of this disclosure.

Optionally, in S704, if the access management network element further sends the preset correspondence while sending the session establishment request to the session management network element supporting the multicast service, the preset correspondence may be used to instruct the session management network element to establish the session used for the multicast service.

S705. The session management network element receives the session establishment request from the access management network element.

In a possible implementation, in S704, on the basis of sending the session establishment request including the multicast joining information to the session management network element supporting the multicast service, if the access management network element further sends the preset correspondence to the session management network element supporting the multicast service, in S705, the session management network element receives the preset correspondence.

In a possible implementation, in S704, if the access management network element sends the session establishment request including the multicast joining information to the session management network element supporting the multicast service, but does not send the preset correspondence, and the session establishment request includes the address information of the terminal or the identifier information of the terminal, in S705, the session management network element may obtain, as the terminal information of the terminal, the address information of the terminal or the identifier information of the terminal that is included in the session establishment request, and associate the terminal information of the terminal with the multicast address in the multicast joining information included in the session establishment request into the preset correspondence.

In a possible implementation, in S704, if the access management network element sends the session establishment request including the multicast joining information to the session management network element supporting the multicast service, but does not send the preset correspondence, and the session establishment request includes the address information or the identifier information of the connection device on the connection accessed by the terminal, in S705, the session management network element may obtain, as the connection information of the terminal, the address information or the identifier information of the connection device on the connection accessed by the terminal that is included in the session establishment request, and associate the connection information of the terminal with the multicast address in the multicast joining information included in the session establishment request into the preset correspondence.

S706. The session management network element selects a user plane network element supporting the multicast service.

Optionally, the session management network element may determine, based on the multicast joining information included in the session establishment request received in S705, to establish the session used for the multicast service, and select, in S706, the user plane network element supporting the multicast service, so that the established session supports the multicast service.

Optionally, the session management network element may determine, based on the preset correspondence received in S705, to establish the session used for the multicast service, and select, in S706, the user plane network element supporting the multicast service, so that the established session supports the multicast service.

S707. The session management network element sends a session establishment request message to a multicast function network element by using the user plane network element supporting the multicast service.

In S707, the session establishment request message from the session management network element to the multicast function network element by using the user plane network element supporting the multicast service may include the multicast joining information, or may include the multicast joining information and the address information of the terminal, or may include the multicast joining information and the identifier information of the terminal. This is not specifically limited in this embodiment of this disclosure.

Optionally, in S707, the session management network element may send the session establishment request message to the multicast function network element by using the user plane network element supporting the multicast service, where the session establishment request message includes the multicast joining information, and the multicast joining information is used by the multicast function network element to establish the preset correspondence.

Optionally, in S707, the session management network element may send the session establishment request message to the multicast function network element by using the user plane network element supporting the multicast service, where the session establishment request message includes the multicast joining information and the address information or the identifier information of the terminal, and the multicast joining information is used by the multicast function network element to establish the preset correspondence.

Optionally, in S707, on the basis of sending the session establishment request to the multicast function network element by using the user plane network element supporting the multicast service, the session management network element may further send the preset correspondence to the multicast function network element by using the user plane network element supporting the multicast service. The preset correspondence may be established by the session management network element in S705, or may be received by the session management network element from the access management network element in S705.

In a possible implementation, in S707, the session management network element sends the preset correspondence or the session establishment request message including the multicast joining information, to instruct to perform the multicast service through the session established this time, so that the user plane network element or the multicast function network element enables a multicast function. In this way, the user plane network element or the multicast function network element only needs to determine whether a specific session is used to transmit multicast data, thereby improving data transmission efficiency.

It should be noted that FIG. 7 shows only a case in which the multicast function network element is separately deployed, but does not constitute a limitation on a case in which the multicast function network element is deployed inside the user plane network element.

S708. The multicast function network element establishes the session with the terminal.

The session established in S708 is the session that the multicast indication information is used to instruct to establish and that is used for the multicast service.

Optionally, in S707, if the session management network element sends the session establishment request message including the multicast joining information to the multicast function network element by using the user plane network element supporting the multicast service, in S708, the multicast function network element may further obtain, as the terminal information of the terminal, the address information allocated to the terminal in a session establishment process or a session identifier of the established session, and associate the terminal information of the terminal with the multicast address in the multicast joining information into the preset correspondence.

Optionally, in S707, if the session management network element sends the session establishment request message including the multicast joining information to the multicast function network element by using the user plane network element supporting the multicast service, and the session establishment request further includes the address information or the identifier information of the terminal, in S708, the multicast function network element may further obtain, as the terminal information of the terminal, the address information or the identifier information of the terminal that is included in the session establishment request, and associate the terminal information of the terminal with the multicast address in the multicast joining information into the preset correspondence.

Optionally, in S707, if the session management network element sends the session establishment request message including the multicast joining information to the multicast function network element by using the user plane network element supporting the multicast service, in S708, the multicast function network element may further obtain, as the connection information of the terminal, a session identifier of the established session or the address information allocated in a session establishment process to the connection device on the connection accessed by the terminal, and associate the connection information of the terminal with the multicast address in the multicast joining information into the preset correspondence.

Optionally, in S707, if the session management network element sends the session establishment request message including the multicast joining information to the multicast function network element by using the user plane network element supporting the multicast service, and the session establishment request further includes the address information or the identifier information allocated to the connection device on the connection accessed by the terminal, in S708, the multicast function network element may further obtain, as the connection information of the terminal, the address information or the identifier information allocated to the connection device on the connection accessed by the terminal that is included in the session establishment request, and associate the connection information of the terminal with the multicast address in the multicast joining information into the preset correspondence.

Optionally, in S707, if the session management network element sends the session establishment request message to the multicast function network element by using the user plane network element supporting the multicast service, and further sends the preset correspondence to the multicast function network element by using the user plane network element supporting the multicast service, in S708, the multicast function network element directly obtains the preset correspondence.

Specifically, in S708, a control plane network element between the multicast function network element and the terminal establishes the session between the multicast function network element and the terminal through message exchange. The process is the same as an existing session establishment process, and details are not described herein.

After the session is established, the terminal enters a data transmission phase, and performs the processes of S609 to S618. Details are not described herein again.

It should be noted that in the multicast method shown in FIG. 7, a difference from the multicast method shown in FIG. 6A and FIG. 6B or FIG. 6*a*-1 and FIG. 6*a*-2 is that the multicast indication information is the multicast joining information, and for other specific implementations, refer to the descriptions of the specific implementations in the multicast method shown in FIG. 6A and FIG. 6B or FIG. 6*a*-1 and FIG. 6*a*-2. Details are not described herein again.

The foregoing mainly describes, from a perspective of working processes of network elements in the communications network, the solutions provided in the embodiments of this disclosure. It may be understood that to implement the foregoing methods, the network element in the communications network includes a corresponding hardware structure and/or a corresponding software module for performing the steps. Persons skilled in the art should easily be aware that, in combination with units and algorithm steps of the examples described in the embodiments disclosed in this specification, this disclosure may be implemented by hardware or a combination of hardware and computer software. Whether a function is performed by hardware or hardware driven by computer software depends on particular applications and design constraints of the technical solutions. In the embodiments of this disclosure, the network element in the communications network may be divided into modules based on the foregoing method examples. For example, modules corresponding to the steps may be obtained through division, or two or more steps may be integrated into one processing module. The integrated module may be implemented in a form of hardware, or may be implemented in a form of a software function module.

Figure 8:
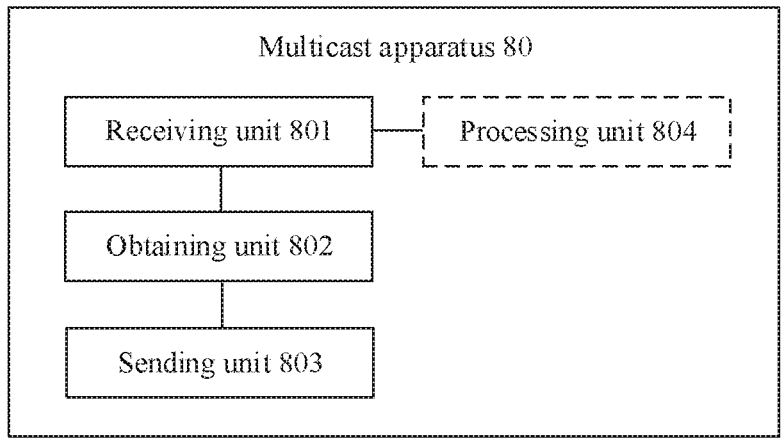
FIG. 8 is a structural diagram of a multicast apparatus according to an embodiment of this disclosure.

FIG. 8 is a possible schematic structural diagram of a multicast apparatus in the foregoing embodiments. The multicast apparatus 80 may be configured to perform functions of the multicast function network element in the foregoing method embodiments. The multicast apparatus 80 may include a receiving unit 801, an obtaining unit 802, and a sending unit 803. The receiving unit 801 is configured to support the multicast apparatus 80 in performing the processes S401, S402b, S402d, and S501 in FIG. 4, FIG. 5, or FIG. 5a and the processes S610, S611, and S615 in FIG. 6B or FIG. 6a-2. The obtaining unit 802 is configured to support the multicast apparatus 80 in performing the processes S402 and S502 in FIG. 4, FIG. 5, or FIG. 5a and the processes S612 and S616 in FIG. 6B or FIG. 6a-2. The sending unit 803 is configured to support the multicast apparatus 80 in performing the processes S403 and S503 in FIG. 4, FIG. 5, or FIG. 5a and the processes S613 and S617 in FIG. 6B or FIG. 6a-2. All related content of the steps in the foregoing method embodiments may be cited in descriptions of corresponding modules, and details are not described herein again.

Further, optionally, as shown in FIG. 8, the multicast apparatus 80 may further include a processing unit 804. The processing unit 804 is configured to support the multicast apparatus 80 in performing the process S608 in FIG. 6B or FIG. 6a-2 and the process S708 in FIG. 7.

Figure 9:
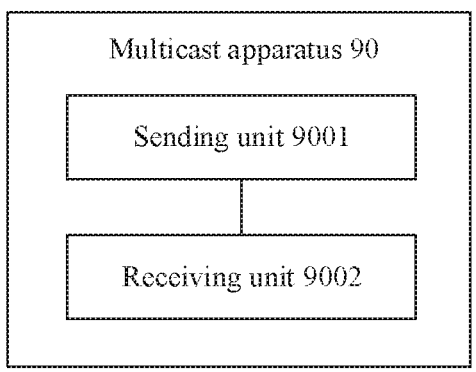
FIG. 9 is a structural diagram of another multicast apparatus according to an embodiment of this disclosure.

FIG. 9 is a possible schematic structural diagram of a multicast apparatus in the foregoing embodiments. The multicast apparatus 90 may be configured to perform functions of the terminal in the foregoing method embodiments. The multicast apparatus 90 may include a sending unit 9001 and a receiving unit 9002. The sending unit 9001 is configured to support the multicast apparatus 90 in performing the process S402a in FIG. 5, the processes S601 and S609 in FIG. 6A and FIG. 6B or FIG. 6a-1 and FIG. 6a-2, and the process S701 in FIG. 7. The receiving unit 9002 is configured to support the multicast apparatus 90 in performing the processes S404 and S504 in FIG. 4, FIG. 5, or FIG. 5a and the processes S614 and S618 in FIG. 6B or FIG. 6a-2. All related content of the steps in the foregoing method embodiments may be cited in function descriptions of corresponding function modules, and details are not described herein again.

Figure 10:
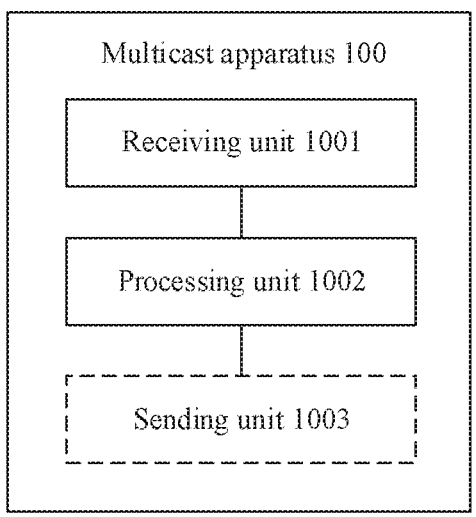
FIG. 10 is a structural diagram of still another multicast apparatus according to an embodiment of this disclosure.

FIG. 10 is a possible schematic structural diagram of a multicast apparatus in the foregoing embodiments. The multicast apparatus 100 may be configured to perform functions of the access management network element or the session management network element in the foregoing method embodiments. The multicast apparatus 100 may include a receiving unit 1001 and a processing unit 1002. The receiving unit 1001 is configured to support the multicast apparatus 100 in performing the processes S602 and S605 in FIG. 6A or FIG. 6a-1 and the processes S702 and S705 in FIG. 7. The processing unit 1002 is configured to support the multicast apparatus 100 in performing the processes S603 and S606 in FIG. 6A or FIG. 6a-1 and the processes S703 and S706 in FIG. 7. All related content of the steps in the foregoing method embodiments may be cited in function descriptions of corresponding function modules, and details are not described herein again.

Further, optionally, as shown in FIG. 10, the multicast apparatus 100 may further include a sending unit 1003. The sending unit 1003 is configured to support the multicast apparatus 100 in performing the processes S604 and S607 in FIG. 6A or FIG. 6a-l and the processes S704 and S707 in FIG. 7.

Figure 11:
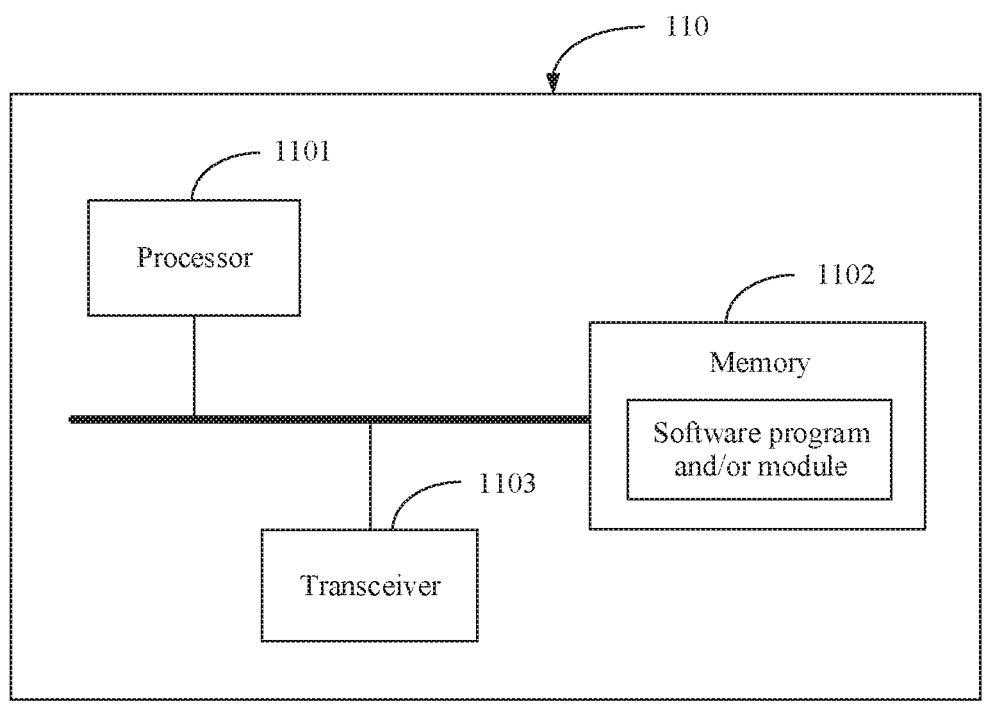
FIG. 11 is a structural diagram of yet another multicast apparatus according to an embodiment of this disclosure.

FIG. 11 is a possible schematic structural diagram of a multicast apparatus in the foregoing embodiments. As shown in FIG. 11, the multicast apparatus 110 may include a processor 1101, a memory 1102, and a transceiver 1103. The multicast apparatus 110 may perform functions of the multicast function network element, the terminal, the access management network element, or the session management network element in the foregoing method embodiments.

The following describes the components of the multicast apparatus 110 in detail with reference to FIG. 11.

The memory 1102 may be a volatile memory, for example, a random access memory (RAM); a non-volatile memory, for example, a read-only memory (ROM), a flash memory, a hard disk drive (HDD), or a solid-state disk (SSD); or a combination of the foregoing types of memories, and is configured to store program code and a configuration file that can implement the methods in this disclosure.

The processor 1101 is a control center of the multicast apparatus 110, and may be a central processing unit (CPU), an application-specific integrated circuit (ASIC), or one or more integrated circuits configured to implement the embodiments of this disclosure, for example, one or more microprocessors (DSP) or one or more field programmable gate arrays (FPGA). The processor 1101 may perform various functions of the multicast apparatus 110 by running or executing a software program and/or module that is stored in the memory 1102 and invoking data stored in the memory 1102.

The transceiver 1103 is configured to support the multicast apparatus 110 in interacting with another network element. For example, the transceiver 1103 may be a transceiver circuit or a communications interface.

Optionally, when the multicast apparatus 110 performs the functions of the multicast function network element in the foregoing method embodiments, the processor 1101 runs or executes the software program and/or module that is stored in the memory 1102 and invokes the data stored in the memory 1102, to support, by using the transceiver 1103, the multicast apparatus 110 in performing the processes S401. S402b, S402d, S403, S501, and S503 in FIG. 4, FIG. 5, or FIG. 5a and the processes S610, S611, S613, S615, and S617 in FIG. 6B or FIG. 6a-2; and support the multicast apparatus 110 in performing the processes S402 and S502 in FIG. 4, FIG. 5, or FIG. 5a and the processes S612 and S616 in FIG. 6B or FIG. 6a-2.

Optionally, when the multicast apparatus 110 performs the functions of the terminal in the foregoing method embodiments, the processor 1101 runs or executes the software program and/or module that is stored in the memory 1102 and invokes the data stored in the memory 1102, to support, by using the transceiver 1103, the multicast apparatus 110 in performing the processes S402*a*, S404, and S504 in FIG. 5 or FIG. 5*a*, the processes S601. S609, S614, and S618 in FIG. 6A and FIG. 6B or FIG. 6*a*-1 and FIG. 6*a*-2, and the process S701 in FIG. 7.

Optionally, when the multicast apparatus 110 performs the functions of the access management network element in the foregoing method embodiments, the processor 1101 runs or executes the software program and/or module that is stored in the memory 1102 and invokes the data stored in the memory 1102, to support, by using the transceiver 1103, the multicast apparatus 110 in performing the process S602 in FIG. 6A or FIG. 6*a*-1 and the process S702 in FIG. 7, and support the multicast apparatus 110 in performing the process S603 in FIG. 6A or FIG. 6*a*-1 and the process S703 in FIG. 7.

Optionally, when the multicast apparatus 110 performs the functions of the session management network element in the foregoing method embodiments, the processor 1101 runs or executes the software program and/or module that is stored in the memory 1102 and invokes the data stored in the memory 1102, to support, by using the transceiver 1103, the multicast apparatus 110 in performing the process S605 in FIG. 6A or FIG. 6*a*-1 and the process S705 in FIG. 7, and support the multicast apparatus 110 in performing the process S606 in FIG. 6A or FIG. 6*a*-1 and the process S706 in FIG. 7.

As described above, the multicast function network element 80, 90, 100, or 110 provided in the embodiments of this disclosure may be configured to implement the methods implemented in the embodiments of this disclosure. For ease of description, only parts related to the embodiments of this disclosure are shown. For specific technical details that are not disclosed, refer to the embodiments of this disclosure.

According to still another aspect, an embodiment of this disclosure provides a multicast system, including the multicast apparatus for performing functions of the multicast function network element and the multicast apparatus for performing functions of the terminal that are described in any one of the foregoing embodiments.

According to still another aspect, an embodiment of this disclosure provides a multicast system, including the multicast apparatus for performing functions of the multicast function network element, the multicast apparatus for performing functions of the terminal, the multicast apparatus for performing functions of the access management network element, and the multicast apparatus for performing functions of the session management network element that are described in any one of the foregoing embodiments.

According to still another aspect, an embodiment of this disclosure provides a computer storage medium, configured to store a computer software instruction used by any one of the foregoing multicast apparatuses. The computer software instruction includes a program designed for performing any one of the foregoing method embodiments.

Method or algorithm steps described in combination with the content disclosed in this disclosure may be implemented by hardware, or may be implemented by a processor by executing a software instruction. The software instruction may include a corresponding software module. The software module may be stored in a RAM, a flash memory, a ROM, an erasable programmable read-only memory (EPROM), an electrically erasable programmable read-only memory (EE-PROM), a register, a hard disk, a mobile hard disk, a compact disc read-only memory, or any other form of storage medium well-known in the art. For example, a storage medium is coupled to a processor, so that the processor can read information from the storage medium and write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist in the core network interface device as discrete components.

It may be clearly understood by persons skilled in the art that, for the purpose of convenient and brief description, for detailed working processes of the foregoing system, apparatus, and unit, refer to corresponding processes in the foregoing method embodiments, and details are not described herein again.

Persons skilled in the art should be aware that in the foregoing one or more examples, functions described in this disclosure may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

It may be clearly understood by persons skilled in the art that, for the purpose of convenient and brief description, for the detailed working processes of the foregoing system, apparatus, and unit, refer to the corresponding processes in the foregoing method embodiments, and details are not described herein again.

In the several embodiments provided in this disclosure, it should be understood that the disclosed system, apparatus, and method may be implemented in other manners. For example, the apparatus embodiments described above are merely examples. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, a network device, or the like) to perform some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of this disclosure, but not for limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A multicast method, comprising:
    establishing, by a multicast function network element deployed in a user plane network element of a core network, a session with a terminal, wherein the session is established for the terminal for a multicast service;
    receiving, by the multicast function network element from the terminal, multicast joining information through a user plane, wherein the multicast joining information comprises a multicast address corresponding to a multicast group;
    establishing, by the multicast function network element, a correspondence between identifier information of the session and the multicast address;
    receiving, by the multicast function network element, multicast data from a multicast source, wherein the multicast data comprises the multicast address;
    obtaining, by the multicast function network element based on the established correspondence, the identifier information of the session corresponding to the multicast address; and
    sending, by the multicast function network element, the multicast data to the terminal through the session.

2. The multicast method according to claim 1, wherein the establishing, by the multicast function network element, the session with the terminal, comprises:
    obtaining, by the multicast function network element, the identifier information of the session.

3. The multicast method according to claim 1, further comprising:
    receiving, by the multicast function network element from the terminal, multicast indication information indicating that the multicast service is performed through the session.

4. The multicast method according to claim 3, wherein the multicast indication information comprises a data network name.

5. The multicast method according to claim 3, wherein the receiving, by the multicast function network element from the terminal, the multicast indication information comprises:
    receiving, by the multicast function network element from the terminal, a session establishment request, wherein the session establishment request comprises the multicast indication information.

6. An apparatus deployed in a user plane network element of a core network, comprising:
    at least one processor;
    one or more non-transitory computer-readable storage medium coupled to the at least one processor and storing programming instructions for execution by the at least one processor, wherein the programming instructions, when executed, cause the apparatus to perform operations comprising:
    establishing a session with a terminal, wherein the session is established for the terminal for a multicast service;
    receiving, from the terminal, multicast joining information through a user plane, wherein the multicast joining information comprises a multicast address corresponding to a multicast group;
    establishing a correspondence between identifier information of the session and the multicast address;
    receiving multicast data from a multicast source, wherein the multicast data comprises the multicast address;
    obtaining based on the established correspondence the identifier information of the session corresponding to the multicast address; and
    sending the multicast data to the terminal through the session.

7. The apparatus according to claim 6, wherein the establishing the session with the terminal, comprises:
    obtaining the identifier information of the session.

8. The apparatus according to claim 6, wherein the operations further comprise:
    receiving, from the terminal, multicast indication information indicating that the multicast service is performed through the session.

9. The apparatus according to claim 8, wherein the multicast indication information comprises a data network name.

10. The apparatus according to claim 8, wherein the receiving from the terminal the multicast indication information comprises: receiving, from the terminal, a session establishment request, wherein the session establishment request comprises the multicast indication information.

11. A system, comprising:
    a multicast apparatus deployed in a user plane network element of a core network, configured to: establish a session with a terminal, wherein the session is established for the terminal for a multicast service; receive, from the terminal, multicast joining information through a user plane, wherein the multicast joining information comprises a multicast address corresponding to a multicast group; establish a correspondence between identifier information of the session and the multicast address; receive multicast data from a multicast source, wherein the multicast data comprises the multicast address; obtain based on the established correspondence, the identifier information of the session corresponding to the multicast address; and send the multicast data to the terminal through the session; and
    an access network device, configured to: receive multicast joining information from the terminal and send the multicast joining information to the multicast apparatus.

12. The system according to claim 11, wherein the multicast apparatus is configured to obtain the identifier information of the session.

13. The system according to claim 11, wherein the multicast apparatus is further configured to receive, from the terminal, multicast indication information indicating that the multicast service is performed through the session.

14. The system according to claim 13, wherein the multicast indication information comprises a data network name.

15. The system according to claim 13, wherein the multicast apparatus is configured to receive, from the terminal, a session establishment request, wherein the session establishment request comprises the multicast indication information.

16. A non-transitory computer readable storage medium, comprising computer readable instruction, which when executed on a computer, cause an apparatus that comprises the computer and that is deployed in a user plane network element of a core network to:

establish a session with a terminal, wherein the session is established for the terminal for a multicast service;

receive, from the terminal, multicast joining information through a user plane, wherein the multicast joining information comprises a multicast address corresponding to a multicast group;

establish a correspondence between identifier information of the session and the multicast address;

receive multicast data from a multicast source, wherein the multicast data comprises the multicast address;

obtain based on the established correspondence the identifier information of the session corresponding to the multicast address; and send the multicast data to the terminal through the session.

17. A multicast method, comprising:

establishing, by a multicast apparatus deployed in a user plane network element of a core network, a session with a terminal, wherein the session is established for the terminal for a multicast service receiving, by an access network device, multicast joining information from the terminal;

sending, by the access network device, the multicast joining information to the multicast apparatus,;

receiving, by the multicast apparatus from the terminal, the multicast joining information through a user plane, wherein the multicast joining information comprises a multicast address corresponding to a multicast group;

establishing, by the multicast apparatus, a correspondence between identifier information of the session and the multicast address;

receiving, by the multicast apparatus, multicast data from a multicast source, wherein the multicast data comprises the multicast address;

obtaining, by the multicast apparatus based on the established correspondence, the identifier information of the session corresponding to the multicast address; and sending, by the multicast apparatus, the multicast data to the terminal through the session.

* * * * *